United States Patent [19]

Blackham et al.

[11] Patent Number: 5,173,948

[45] Date of Patent: Dec. 22, 1992

[54] VIDEO IMAGE MAPPING SYSTEM

[75] Inventors: Raymond C. Blackham, Penn Valley; Frank S. Lawrence, Grass Valey, both of Calif.

[73] Assignee: The Grass Valley Group, Inc., Nevada City, Calif.

[21] Appl. No.: 677,548

[22] Filed: Mar. 29, 1991

[51] Int. Cl.⁵ ............................................. G06K 9/32
[52] U.S. Cl. ..................................... 382/44; 382/45; 382/46
[58] Field of Search ........................... 382/41, 44-46; 340/424, 427; 358/138, 160

[56] References Cited

U.S. PATENT DOCUMENTS

| | | | |
|---|---|---|---|
| 4,472,732 | 9/1984 | Bennett et al. | 358/22 |
| 4,563,703 | 1/1986 | Taylor et al. | 358/160 |
| 4,709,393 | 11/1987 | Taylor et al. | 382/41 |
| 4,751,660 | 6/1988 | Hedley | 382/44 |
| 4,757,384 | 7/1988 | Nonweiler et al. | 358/160 |
| 4,835,532 | 5/1989 | Fant | 382/44 |
| 4,875,097 | 10/1989 | Jackson | 358/180 |
| 4,975,976 | 12/1990 | Kimata et al. | 382/44 |

Primary Examiner—Jose Couso
Attorney, Agent, or Firm—John Smith-Hill

[57] ABSTRACT

A video mapping system includes a weighting coefficients generator and a two-dimensional resampling filter that efficiently utilize memory resources and operate fast enough to process a video image stream without introducing artifacts through temporal interpolation. This system can accommodate non-linear and many-to-one mappings, allowing a source two-dimensional video image to be folded over itself in complicated ways to produce an image in the target coordinate system. The only restrictions are that the mapping be piecewise continuous and single-valued. Anti-aliasing filtering is implicit in the approach.

20 Claims, 15 Drawing Sheets

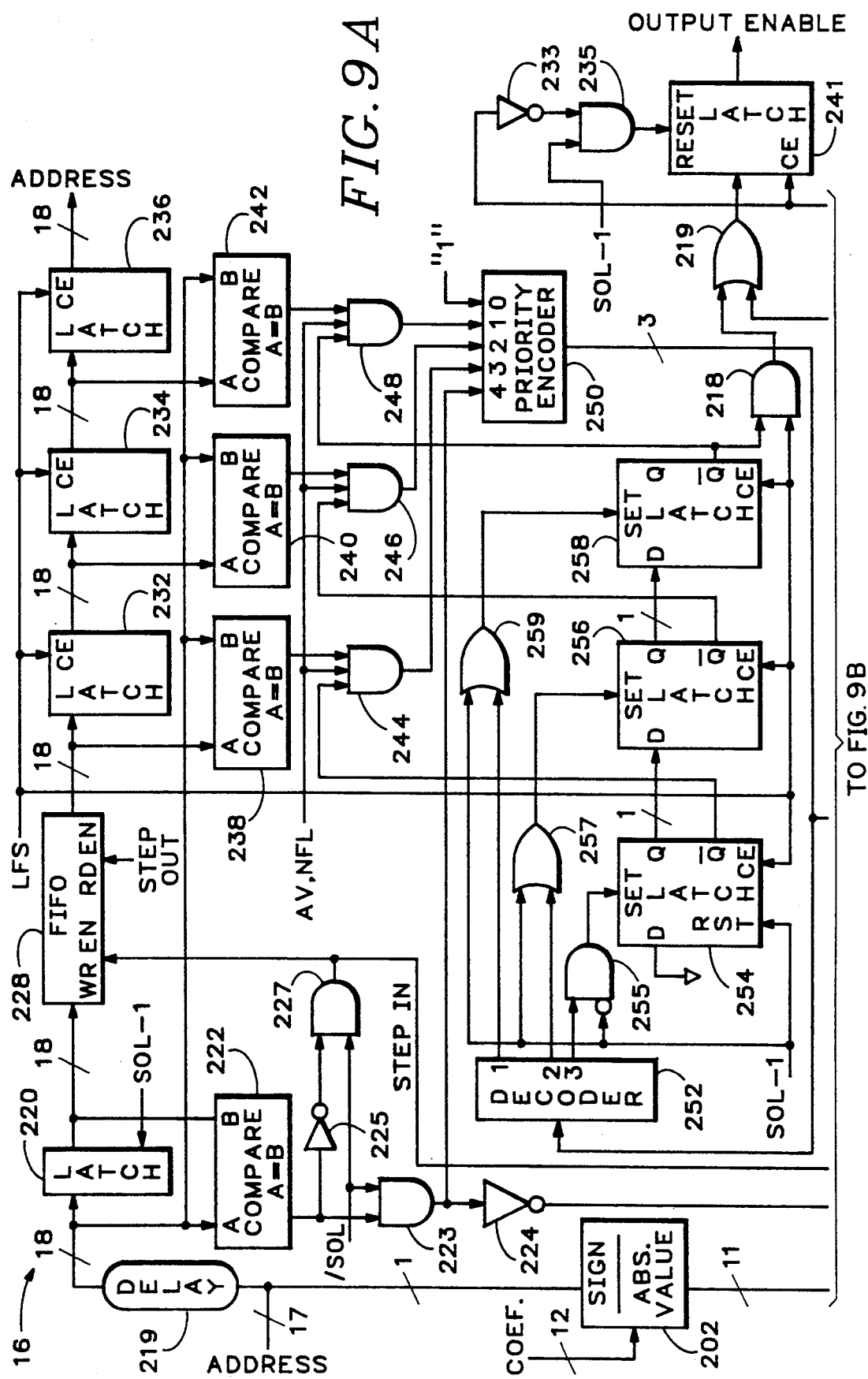

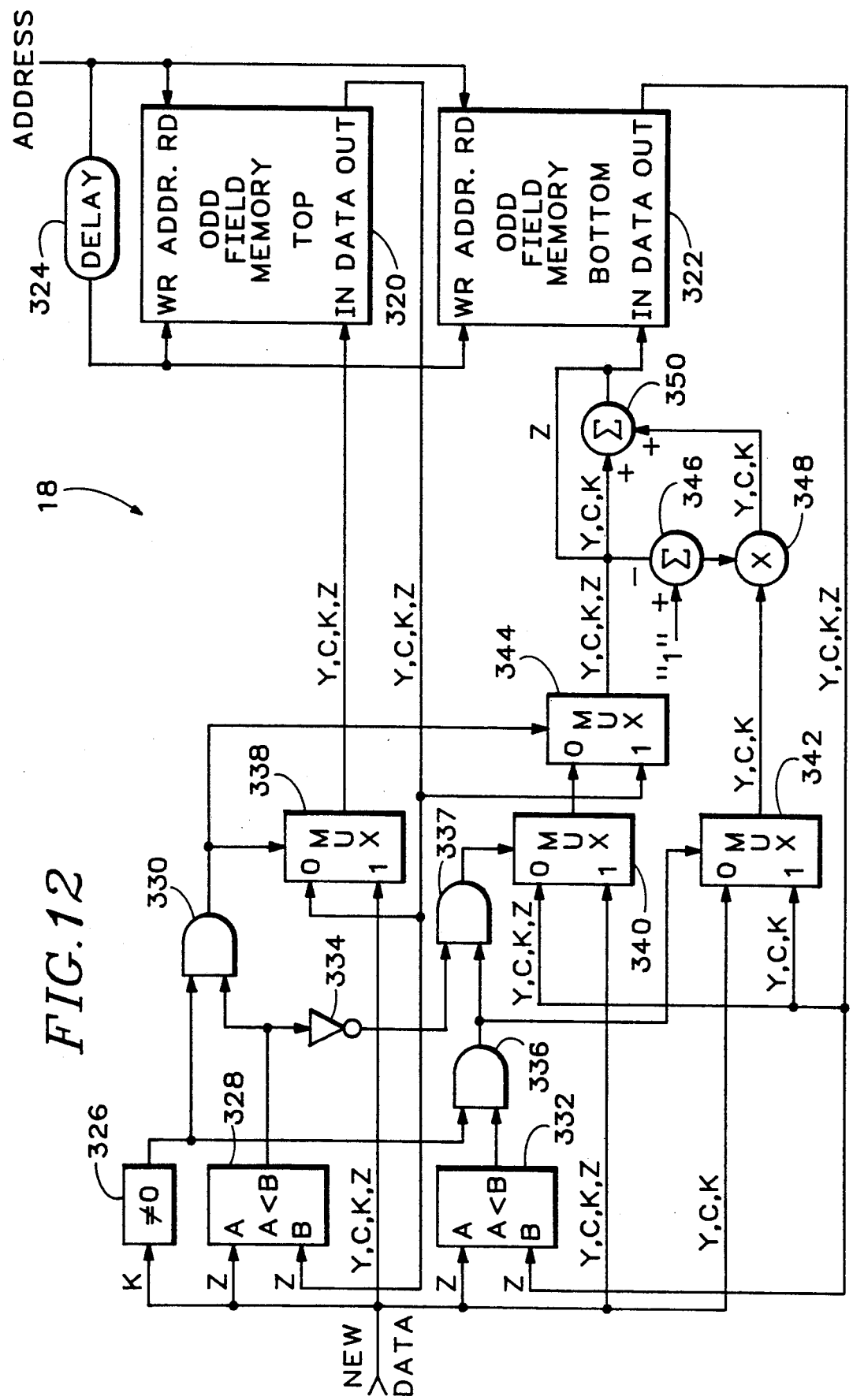

VIDEO IMAGE MAPPING SYSTEM

BACKGROUND OF THE INVENTION

This invention relates to video signal processing, and more particularly to an improved system for transforming a video image in one two-dimensional plane into another two-dimensional plane according to an arbitrary mapping function.

In the field of live video special effects, it is desirable to be able to map one image into another with as much flexibility as possible. Observation of modern television gives an indication of many uses of video special effects, including spatial transformations such as rotations, tearaway images, folding and unfolding images, images moving at different angles to the plane of the actual picture, etc.

In a digital video production facility, a field of video, whether in composite or component form, is processed as a series of luminance, chrominance, keying and (possibly) depth values at sequential pixel locations. A field or frame of such video is transmitted one line of pixels at a time, starting at the top left of the field and moving across one line, then the next, etc. The resulting digital signal can thus be thought of as a two-dimensional real-valued function sampled on a rectangular grid.

It would be desirable to be able to receive a stream of data representing such a video image and map it from a source coordinate system (h,v) into a destination coordinate system (x,y). For simple linear mappings this is a trivial problem. However, for a mapping that is non-linear or many-to-one and therefore able to map an image even if the resulting image is distorted and folded over in a complicated way, a fast and effective transformation mechanism is much more difficult to attain.

An example of such a mapping system is described in U.S. Pat. Nos. 4,563,703, 4,709,393 and 4,757,384, all assigned to Quantel Limited. One aspect of this video signal processing system is the way it produces mapped addresses. As described in the '393 patent at column 5, line 29, to column 6, line 24, mapping shapes are generated by a computer and stored in a disc store. Because access to the disc store is slow relative to video speeds, address interpolation is used both spatially and temporally. (Temporal interpolation is interpolation between two video frames separated in time by other video frames.) Despite the inventor's statement that: "We have found that this technique does not produce any noticeable degradation to the picture produced.", certain types of pictures are adversely affected by these interpolation techniques.

Another aspect of the video signal processing system disclosed in the '393 patent is shown in FIGS. 3 and 4 of that patent and described in the text at column 3, line 6, to column 4, line 43. Four channels of multipliers, summers and framestores process an incoming picture point into a bank of four adjacent pixels in the output video frame, using a series of read-process-write operations. The contents of the same pixel in the four separate framestores are summed together at readout time. It would be desirable to be able to accumulate data for four adjacent output pixels without employing four complete framestore memories.

What is desired is a new approach to video image processing that more efficiently utilizes memory resources and which operates fast enough to process a video image stream without introducing artifacts through temporal and spatial interpolation.

SUMMARY OF THE INVENTION

The video mapping system according to the present invention includes a weighting coefficients generator and a two-dimensional resampling filter that efficiently utilize memory resources and operate fast enough to process a video image stream without introducing artifacts through temporal and spatial interpolation. This system can accommodate non-linear and many-to-one mappings, allowing a source two-dimensional video image to be folded over itself in complicated ways to produce an image in the target coordinate system. The only restrictions on the mapping are that it be piecewise continuous and single-valued.

According to one aspect of the invention, a method is provided for determining the area of a quadrilateral having vertices A, B, C and D that is in each of an array of regions. This method may include the steps of: (a) translating coordinates to place an origin 0 at the center of the array of regions; (b) determining which of a plurality of geometric cases pertains from how the lines A-B, B-D, D-C and C-A forming the perimeter of the quadrilateral intersect an x axis and a y axis passing through the origin; (c) switching coordinate data to appropriate inputs of ratio ascertaining circuitry based on the determined case; (d) ascertaining secondary triangle ratios from the switched coordinate data; (e) calculating primary triangle areas ABO, BDO, DCO and CAO; (f) multiplying the primary triangle areas by the secondary triangle ratios according to the determined case to obtain secondary triangle areas; and (g) combining primary triangle areas with secondary triangle areas according to the determined case to obtain the proportion of the quadrilateral that is within each of the plurality of regions to generate respective weighting coefficients for each of those regions.

According to another aspect of the invention, an incoming stream of pixels from a source video image is mapped into a destination coordinate system and then filtered by resampling to produce output video fields. The contributions of every portion of every incoming pixel that impinges on a particular destination pixel are accumulated to produce values of luminance, chrominance components, keying and depth for the destination pixel. A two-dimensional resampling filter includes a multiplier for multiplying video data by a weighting coefficient to produce a weighted video data element, a comparator for identifying when an incoming pixel is in the same output pixel, an accumulator for accumulating weighted video data elements associated with the same output pixel into a running total, and circuitry for determining when there is no additional data associated with that pixel and outputting the accumulated running total. Multiple layers mapped to the same destination space are combined according to depth, degree of transparency or other factors. Anti-aliasing filtering is implicit in the approach.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIGS. 8A thru 8D are a block diagram of the weighting coefficients generator;

FIGS. 9A and 9B are a block diagram of one bank of the two-dimensional resampling filter shown in FIG. 4;

FIG. 12 is a block diagram of a second version of the field memory that keeps track of top and bottom layers of video using depth information, including the use of keying information to mix bottom layers.

DETAILED DESCRIPTION

In the following description, a frame of video will be considered as composed of abutting rectangular pixels, uniform in size. The point at the center of each pixel rectangle is defined as the pixel's location. These pixel locations are integer points on a rectangular grid. Each pixel location can be defined as an (h,v) pair in a coordinate system whose origin is in the upper left corner of the frame, to the left of and above pixel one of line one. Every pixel of every line can then be defined by integer (h,v) coordinates representing its pixel number (h) and line number (v). Pixel numbers increase moving to the right from the origin, while line numbers increase moving downward from the origin.

Each pixel coordinate has associated with it a luminance value, which we will refer to as Y, chrominance values, I or Q, and a transparency or key value, K. To simplify the following discussion, we will temporarily consider only the luminance values at each pixel location, bearing in mind that other values can be treated similarly. We will also consider one continuous piece of the mapping for now. The luminance value at a particular location (h,v) in the video frame can be assigned a magnitude, $Y(h,v)$.

Figure 1:
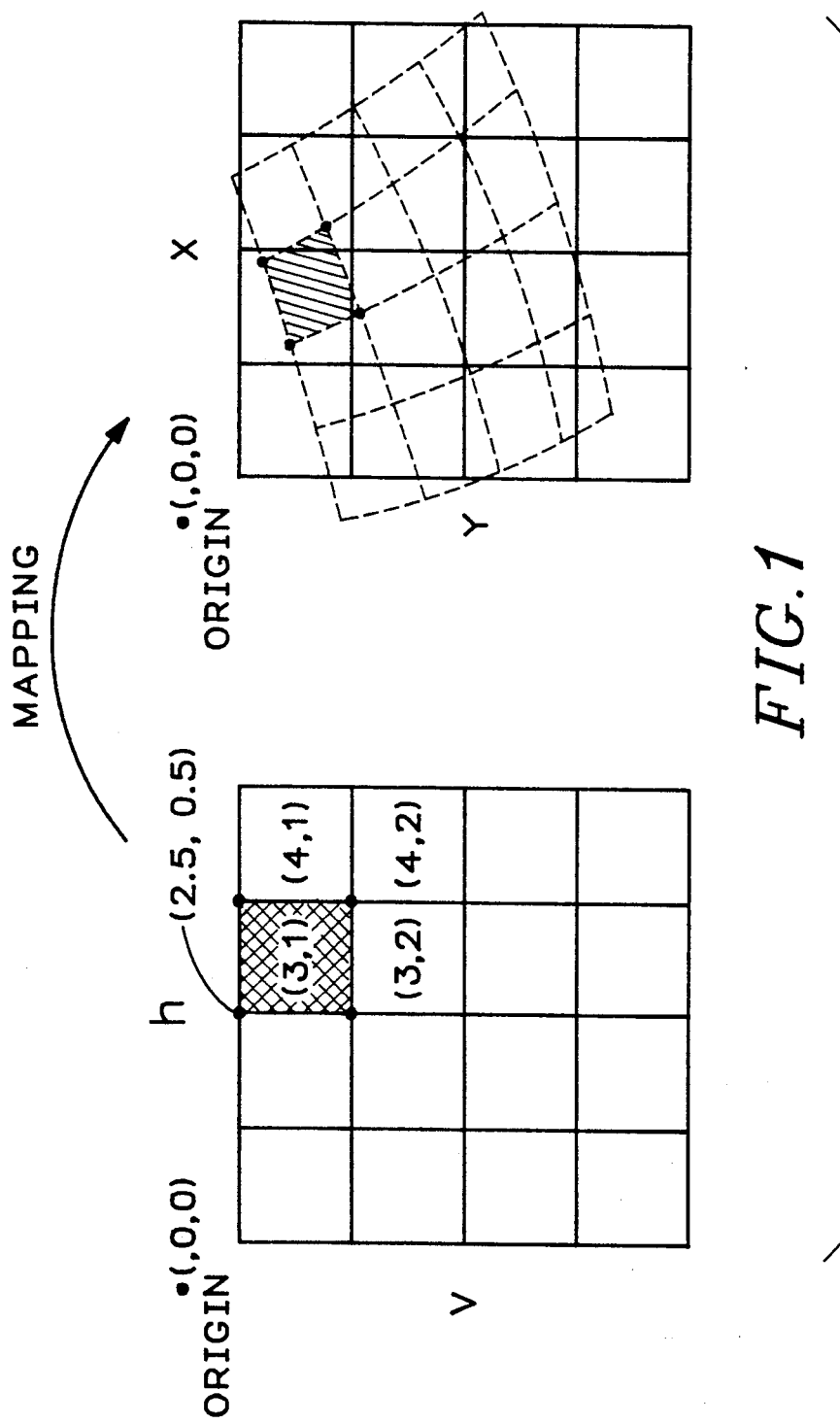
FIG. 1 is an illustration of how rectangles in a source coordinate system are mapped into quadrilaterals in a destination coordinate system.

Referring to FIG. 1, pixels in a source coordinate system (h,v) on the left are shown mapped into a destination coordinate system (x,y) on the right. The pixel (3,1) in the source coordinate system is shown highlighted by shading in the destination coordinate system (x,y). The mapping is applied to the coordinates of the corners of the rectangular pixels in the source coordinate system. Therefore, while each pixel in the source coordinate system is a rectangle (here shown as a square), in the destination coordinate system it normally becomes an arbitrary quadrilateral determined by the mapping function. The quadrilaterals mapped into the destination coordinate system directly abut one another in the destination coordinate system in a continuous manner.

Figure 2:
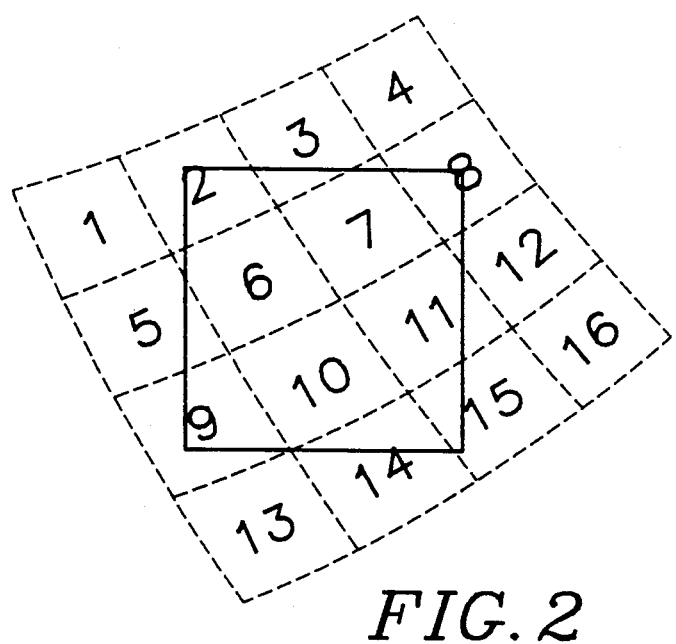
FIG. 2 is an illustration of how a number of quadrilaterals from the source coordinate system can contribute to the value of one destination coordinate system pixel.

Referring now to FIG. 2, a mapped region of 16 source pixels is shown covering one destination pixel. The luminance of this destination pixel, when it is produced, will be the weighted average of the luminance values of all of those source pixels or portions of source pixels, according to how much of their area is within the destination pixel. Using the prefixes "p" for "portion" and "a" for "all", it can be seen that the following source pixels contribute to the value of this destination pixel: p2, p3, p5, p6, p7, p8, p9, a10, p11, p12, p14, p15.

What is now needed, and what is supplied by the system of the present invention, is a way to accumulate the contributions of each of the quadrilaterals mapped from the source coordinate system into the value of the destination coordinate system pixel with appropriate weighting. One method of calculating the appropriate weightings for use in this process is described below, although other approaches could be substituted.

A restriction of this implementation on the mapping function is that no side of any pixel is allowed to be more than 1/sqrt2 (one over the square root of two) of its former size. This guarantees that no mapped quadrilateral will ever impinge on more than four destination coordinate system pixels, thus limiting the amount of hardware required. Relaxing this size restriction requires having a weighting coefficient generator that produces more than four, e.g. nine, coefficients, more than four banks of two-dimensional resampling filters, and a segmentation of odd/even field memories into more than four banks.

Figure 3A:
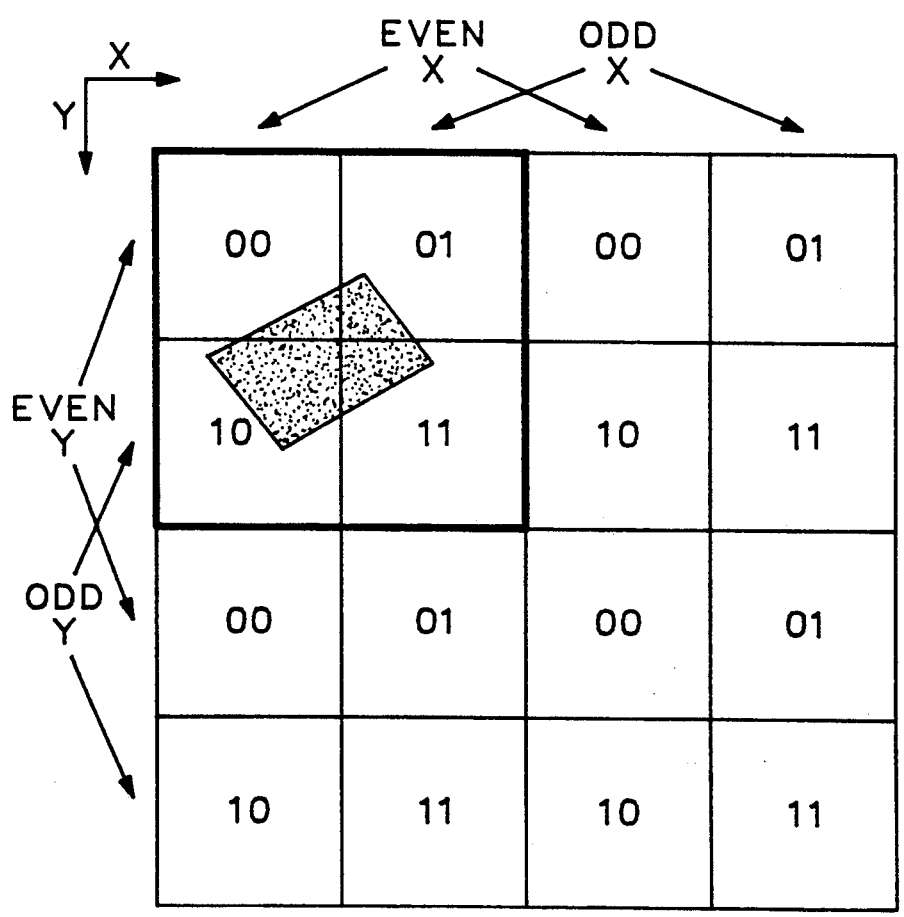
FIGS. 3A thru 3D are illustrations of how one quadrilateral from the source coordinate system may map into four different pixels in the destination coordinate system.
Figure 3C:
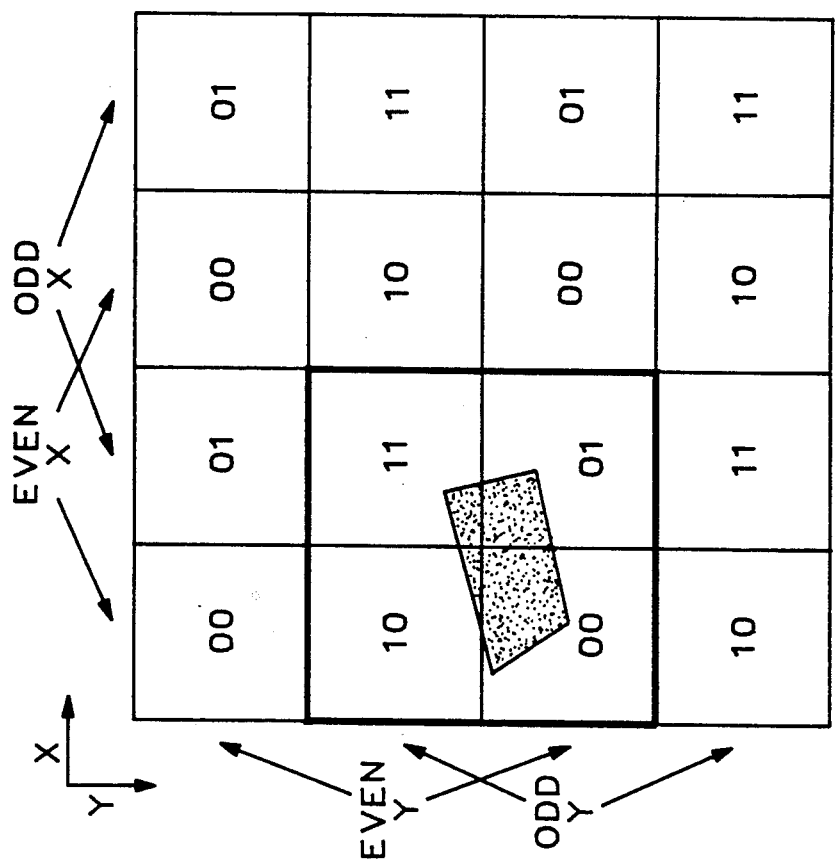
Figure 3B:
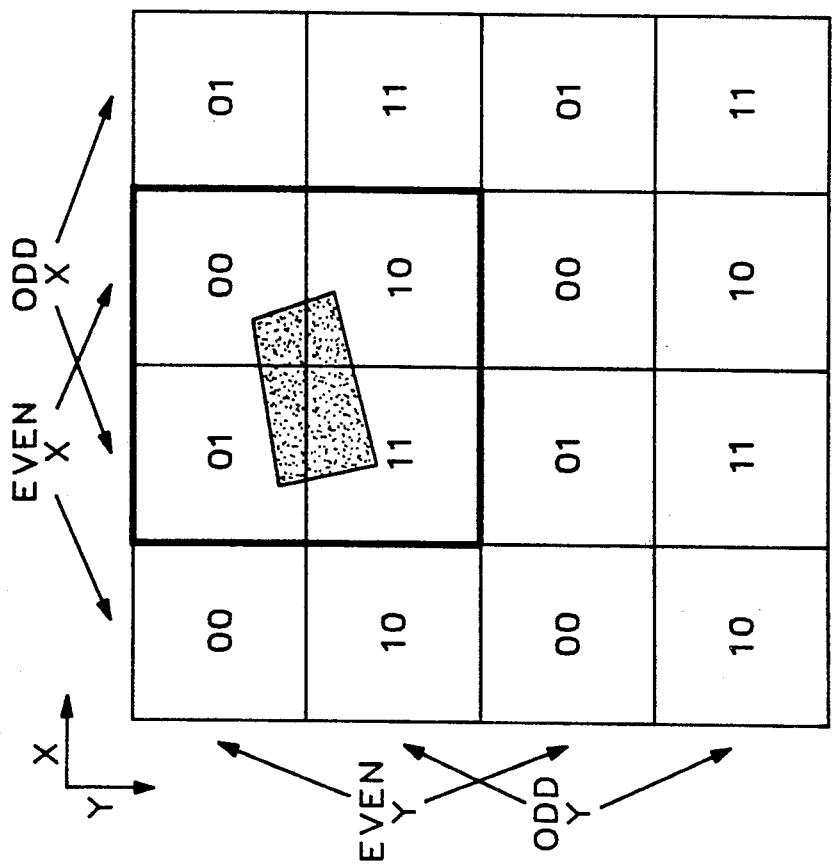
Figure 3D:
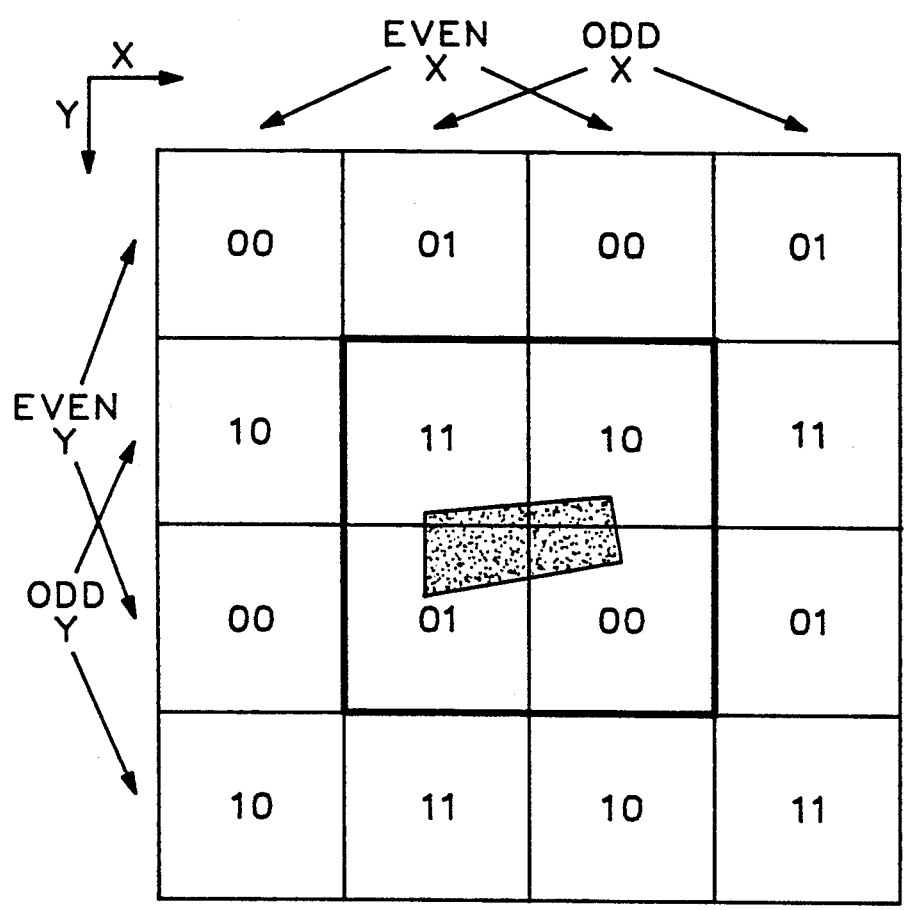

Referring now to FIGS. 3A–3D, the destination coordinate system plane may be considered to consist of four types of pixels: those with even x and even y numbers, 00, those with odd x and even y numbers, 01, those with even x and odd y numbers, 10, and those with odd x and odd y numbers, 11. With the above restriction on the maximum size of mapped quadrilaterals, no more than one of each of these types of destination coordinate system pixels will ever receive input values from one mapped quadrilateral. FIG. 3A shows a quadrilateral that impinges on a bank-set of pixels whose upper left pixel is a 00. FIG. 3B shows a quadrilateral that impinges on a bank-set of pixels whose upper left pixel is a 01. FIG. 3C shows a quadrilateral that impinges on a bank-set of pixels whose upper left pixel is a 10. FIG. 3D shows a quadrilateral that impinges on a bank-set of pixels whose upper left pixel is a 11.

For each quadrilateral, we wish to determine the amount of its area that impinges on each of the (x,y) pixels that it maps into, multiply that area by the luminance (or other) value associated with that quadrilateral, and then accumulate that result into a luminance (or other) value for that pixel.

Figure 4:
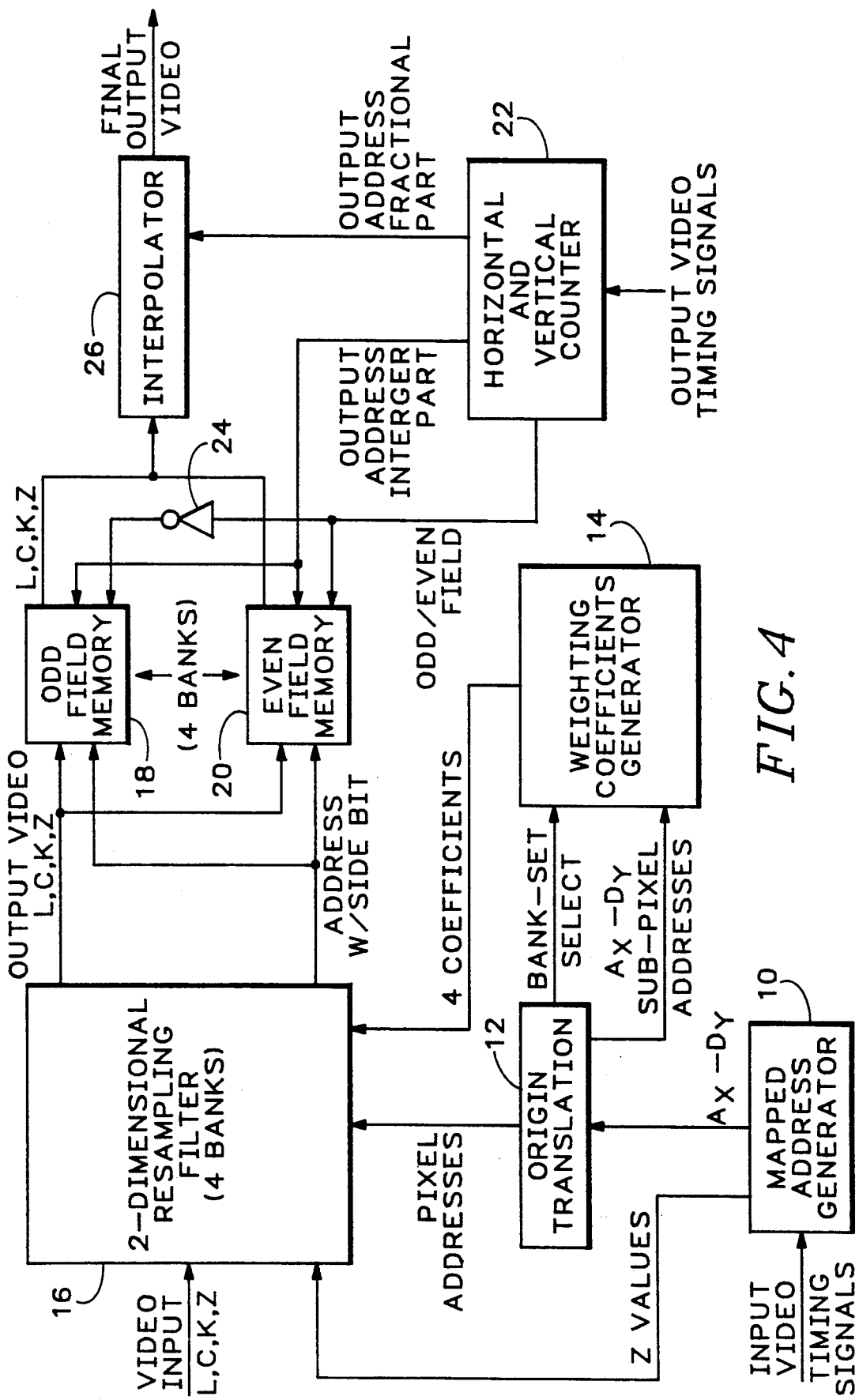
FIG. 4 is an overview block diagram of the image transforming system of the present invention.

Referring now to FIG. 4, an overview block diagram is shown for a video image mapping system according to the present invention. Timing signals from the input video signal are applied to a mapped address generator, 10 which uses them to sequentially generate the addresses of the corners of the pixels in the source coordinate system (h,v). For example, referring to FIG. 1, pixel (3,1)'s upper left corner, (2.5, 0.5), is generated first. Then, when the upper left corner of pixel (4,1) is mapped as (3.5,0.5), it also serves to define the upper right corner of pixel (3,1). Similarly, the mapping of the upper left corner of pixel (3,2) on the next line as (2.5,1.5) serves also to define the lower left corner of pixel (3,1). Finally, the mapping of the upper left corner of pixel (4,2) also serves to define the lower right corner of pixel (3,1).

The mapped address generator 10 then applies the mapping function to these addresses to produce addresses for the corners of the resulting quadrilateral in the destination coordinate system (x,y). A variety of mapping algorithms could be used, such as those described in "Curves and Surfaces for Computer Aided Geometric Design", by Gerald Farin, Academic Press, Inc., Harcourt-Brace-Jovanovich, 2d Ed., 1990, hereby incorporated by reference.

Figure 5:
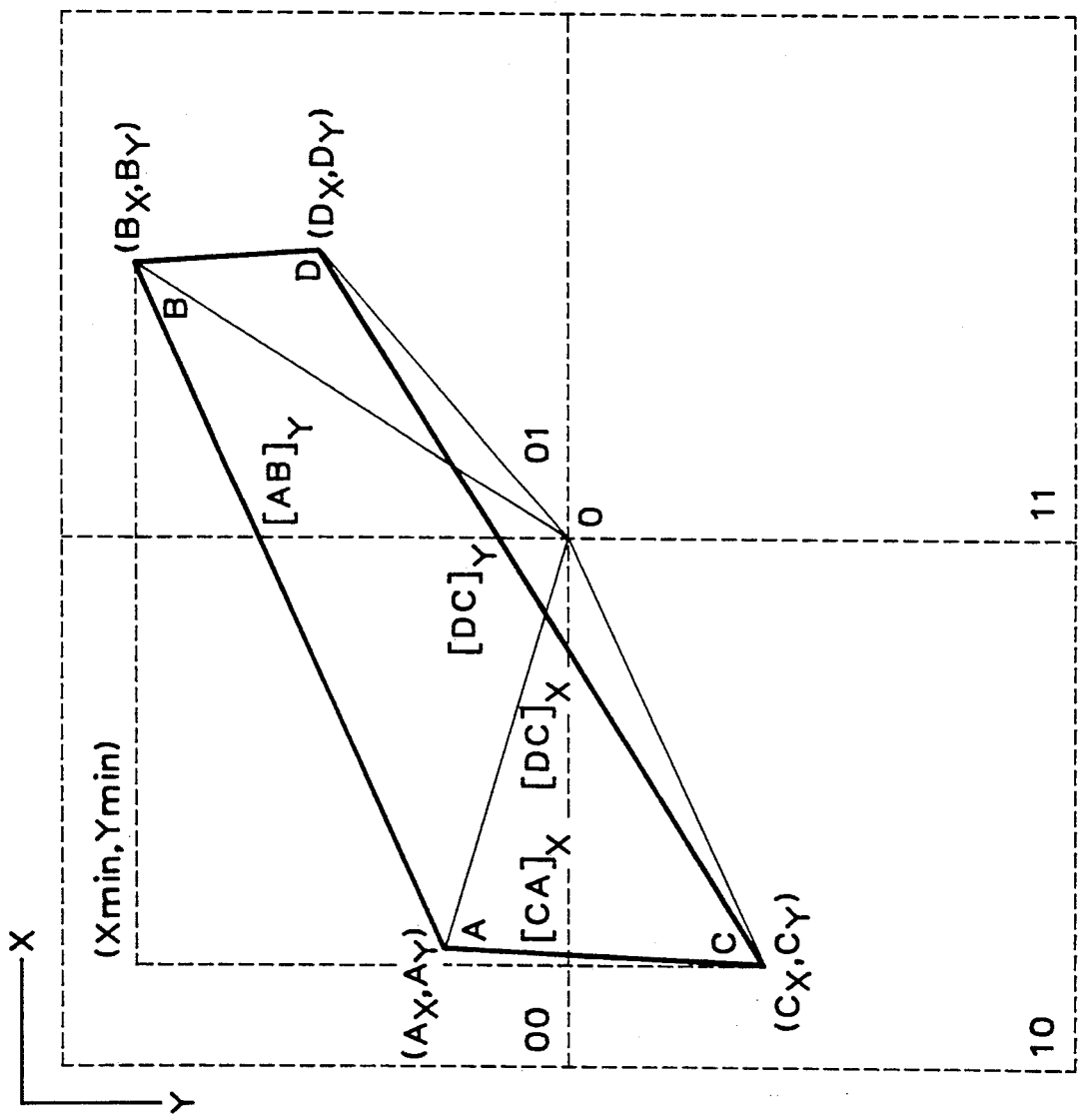
FIG. 5 is an illustration of how a mapped quadrilateral is analyzed by the weight generator.

FIG. 5 shows an example of a quadrilateral defined by corners A, B, C and D in the destination coordinate system. The coordinates of these corners are $(A_x,A_y)$, $(B_x,B_y)$, $(C_x,C_y)$ and $(D_x,D_y)$ Since the corners of the incoming rectangle map to non-integer locations in the output coordinate system, the addresses produced by the mapped address generator 10 are longer than the incoming addresses. The addresses generated by the mapped address generator contain a pixel part that determines the output pixel within which the corner falls, and a sub-pixel part that indicates the location of the corner within the output pixel. Referring again to FIG. 4, the mapped address generator 10 provides the ordinate and abscissa components $A_x$, $A_y$, $B_x$, $B_y$, $C_x$, $C_y$, $D_x$ and $D_y$ (hereafter $A_x$. . . $D_y$) of the corners of the quadrilateral to the origin translation circuitry 12.

The origin translation circuitry 12 finds the minimum x and minimum y values, (X·min, Y·min). The values X·min and Y·min are truncated so that their least significant bits represent two pixels horizontally and two lines vertically, and these pixel addresses (minus one LSB) are sent to a bank-set of four two-dimensional resampling filters 16. X truncated values are sent to banks 01 and 11, while truncated values plus the most significant truncated bit are sent to banks 00 and 10. Y truncated values are sent to banks 10 and 11, while truncated values plus the most significant truncated bit are sent to banks 00 and 01.

The least significant x and y bits of the pixel addresses specify which, of the four cases shown in FIGS. 3A through 3D has occurred. These two bits of bank-set-type information are sent to the weighting coefficients generator 14. As will be further described below, multiplexer control logic in the weighting coefficients generator 14 re-routes incoming sub-pixel addresses and the resulting coefficients generated so that the correct coefficients are applied to the four banks of two-dimensional resampling filters 16 for a particular type of spatial relationship between the four banks.

The origin translation circuitry 12 also sends the sub-pixel portion of the $A_x$ . . . $D_y$ addresses to the weighting coefficients generator 14. How the weighting coefficients generator 14 operates to produce coefficients from this information will be described in detail below. The weighting coefficients generator 14 produces a coefficient for each bank, 00, 01, 10 and 11, and sends the coefficients to the four banks of the two-dimensional resampling filter 16.

Processing by the weighting coefficients generator 14 cannot occur until all four values $(A_x,A_y)$, $(B_x,B_y)$, $(C_x,C_y)$ and $(D_x,D_y)$ have been received. Therefore, the $(A_x,A_y)$ coordinate data is delayed by one pixel and one line delay until the arrival of the $(D_x,D_y)$ coordinates. Similarly, the $(B_x,B_y)$ coordinate data is delayed by one line delay, and the $(C_x,C_y)$ data is delayed by one pixel delay. In the implementation adopted, the mapped address generator 10 incorporates these delays, producing all four corner addresses for each quadrilateral at the same time.

The two-dimensional resampling filter 16 receives the input video information, including luminance (L), chrominance (C) and keying (K), as well as pixel addresses from the origin translation circuitry 12. The two-dimensional resampling filter 16 also receives Z (depth) values from the mapped address generator 10 and coefficients from the weighting coefficients generator 14. As will be described in detail below, the two-dimensional resampling filter 16 produces output video samples, containing L, C, K and Z information based on the input signal L, C, K and map Z, in the destination coordinate system (x,y) and forwards them to odd field memory 18 and even field memory 20. The two-dimensional resampling filter also sends address information, including which side of the video image is showing, to the odd and even field memories 18 and 20.

Output video timing signals are supplied by the studio environment, but must lag the input video timing signal by one frame interval, plus or minus about ten lines. The variability of this timing is under operator control in setting up the system. These timing signals are applied to horizontal and vertical counters 22 to produce an odd/even field signal and output addresses. A fractional part of these output addresses is sent to interpolator circuitry 26, and an integer or pixel part of these output addresses is sent to odd field memory 18 and even field memory 20.

Alternating fields of the output video from the two-dimensional resampling filter 16 are stored in the odd and even field memories 18 and 20 and read back out of them according to the state of the odd/even field signal from the horizontal and vertical counters 22. Inverter 24 causes these identical field memories 18 and 20 to store and read out on opposite phases of the odd/even field signal.

The interpolator 26 receives both odd and even fields of video from all four banks on its input and integrates them into one stream of video, as well as interpolating between points in that stream of video to allow for expansion of the image. Recall that to allow hardware conservation in the weighting coefficients generator and the two-dimensional resampling filter, only compression of the incoming signal was permitted by the restriction that an input quadrilateral mapped into the output coordinate space was not permitted to be more than 1/sqrt2 of its former size. The interpolator allows the overall system to operate as if that restriction were not present by permitting expansion of the output image after mapping and processing according to the present invention.

Referring now to FIG. 5, the area of the quadrilateral in FIG. 5 is the sum of the areas of the triangles CAO, ABO and BDO minus the area of triangle DCO. The area of a triangle is half the modulus of the cross product of two sides that start at the same vertex of the triangle. For example, the area of ABO is ½ || vectorOA x vectorOB ||. Since both vectors are in the xy plane, their cross product is perpendicular to that plane, parallel to the z axis, and there are no x or y components. The z component of the cross product is positive (into the page) if the angle between vectorOA and vectorOB measured counterclockwise is between 0 and −180 degrees, and negative (out of the page) if it is between zero and +180 degrees.

The area of the quadrilateral in FIG. 5 is −½ the Z component of [vectorOA x vectorOB+vectorOB x vectorOD+vectorOD x vectorOC+vectorOC x vectorOA]. Note that because the angle between OD and OC is negative in the order stated, the sign of that result is positive, canceling out part of the other results which were all negative. Thus, the above calculation indeed produced the result (ABO+BDO−CDO+CAO).

Figure 6A:
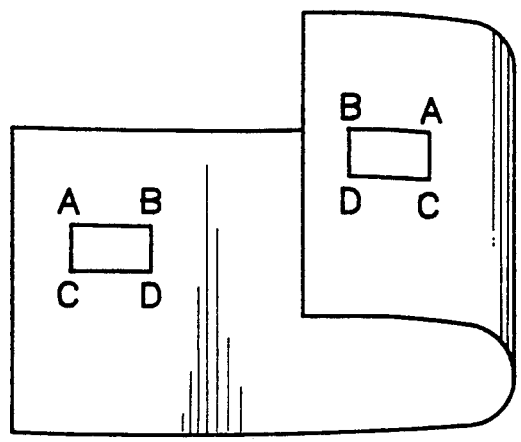
FIG. 6A is an illustration of how folding of the input image appears in the output image.

The above calculation (without the minus sign) yields a negative result if the points ABDC occur clockwise around the perimeter of the quadrilateral, and a positive result if the points occur in a counterclockwise order. Referring to FIG. 6A, since the input scan order corresponds to AB in one line and then CD on the next line, a clockwise order for ABDC occurs when the front side of the input picture remains the front side of the output picture, and a counterclockwise order occurs when the back side of the input picture is mapped to the front side of the output picture.

Referring again to FIG. 5, the portion of the quadrilateral that is within bank 00 is the sum of triangles O[CA]xA and OA[AB]y, minus the area of O[DC]x[DC]y. Point [CA]x is the point where line CA intersects the x axis, and point [AB]y is the point where line AB intersects the y axis. Similarly, points [DC]x and [DC]y are the points where line DC intersects the x and y axes, respectively.

The portion of the quadrilateral in FIG. 5 that is within bank 01 is the sum of triangles O[AB]yB and OBD, minus triangle 0[DC]yD. And, the portion of the same quadrilateral that is within bank 10 is the triangle OC[CA]x minus triangle OC[DC]x. No portion of this quadrilateral is within bank 11.

Figure 7:
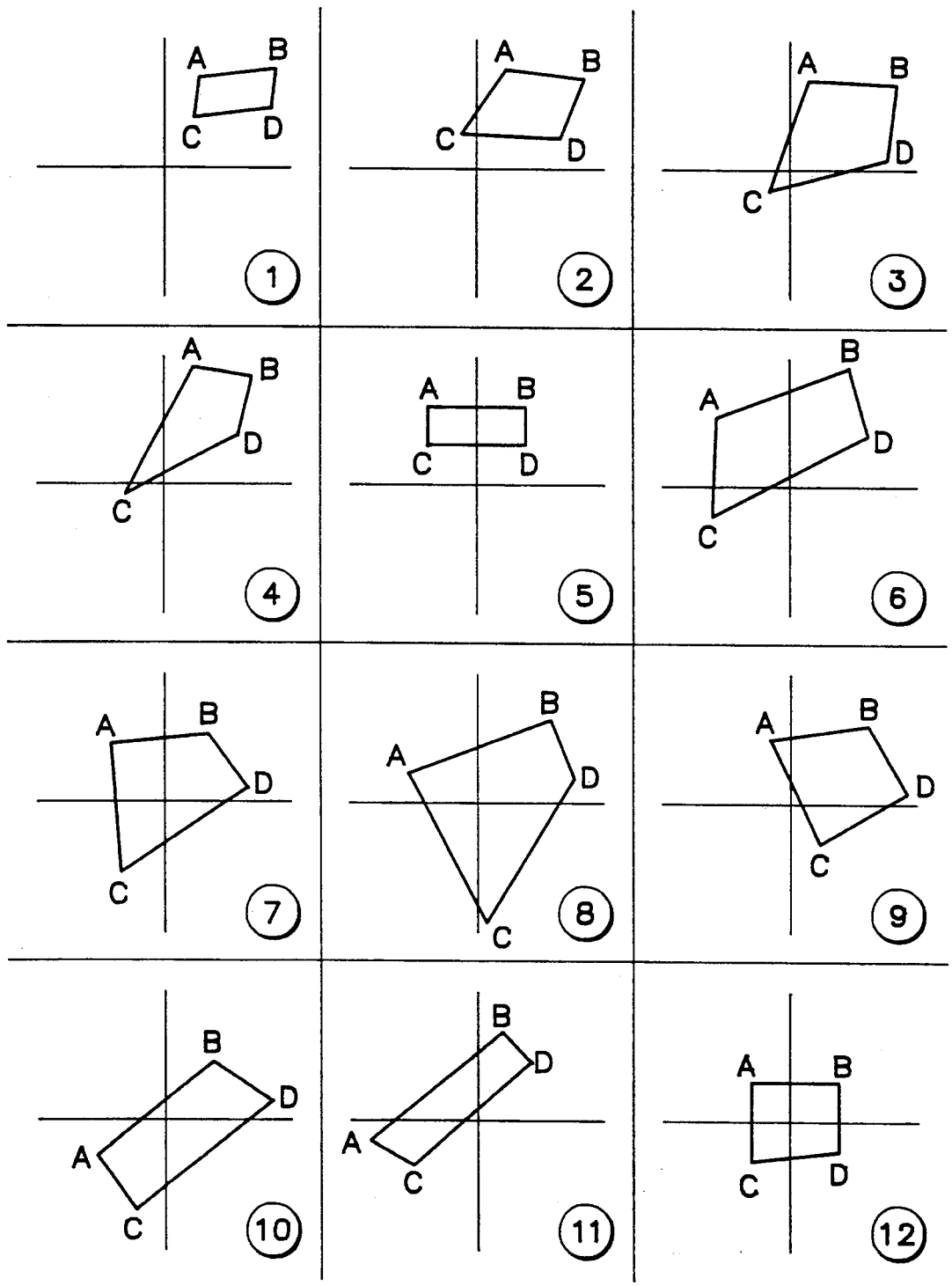
FIG. 7 is an illustration of the twelve basic geometric cases of how a quadrilateral may impinge on four quadrants.

Referring now to FIG. 7 and the following table of geometric case equations, it can be seen that for all 12 possible cases that can arise, some combination of primary triangle areas, such as OAB, and secondary triangle areas, such as O[DC]yC, produces the desired calculation of areas within each blank or quadrant. Actually, there are 48 possible sub-cases, but by rotation they can all be mapped into one of the following 12 cases:

TABLE OF GEOMETRIC CASE EQUATIONS

CASE 1
Quad 01 = OAB + OBD + ODC + OCA
Quad 00 = 0
Quad 10 = 0
Quad 11 = 0

CASE 2
Quad 01 = OAB + OBD + ODC − O[DC]yC + O[CA]yA
Quad 00 = O[DC]yC + OCA − O[CA]yA
Quad 10 = 0
Quad 11 = 0

CASE 3
Quad 01 = OAB + OBD + ODC − O[DC]xC + O[CA]yA
Quad 00 = O[CA]xA − O[CA]yA
Quad 10 = OCA − O[CA]xA + O[DC]yC
Quad 11 = O[DC]xC − O[DC]yC CASE 4
Quad 01 = OAB + OBD + ODC − O[DC]yC + O[CA]yA
Quad 00 = O[CA]xA − O[CA]yA + O[DC]yC − O[DC]xC
Quad 10 = OCA − O[CA]xA + O[DC]xC
Quad 11 = 0

-continued
TABLE OF GEOMETRIC CASE EQUATIONS

CASE 5
Quad 01 = OBD + ODC − O[DC]yC + O[AB]yB
Quad 00 = OAB − O[AB]yB + OCA + O[DC]yC
Quad 10 = 0
Quad 11 = 0

CASE 6
Quad 01 = OBD + ODC − O[DC]yC + O[AB]yB
Quad 00 = OAB − O[AB]yB + O[CA]xA + O[DC]yC − O[DC]xC
Quad 10 = OCA − O[CA]xA + O[DC]xC
Quad 11 = 0

CASE 7
Quad 01 = OBD + ODC − O[DC]xC + O[AB]yB
Quad 00 = OAB − O[AB]yB + O[CA]xA
Quad 10 = OCA − O[CA]xA + O[DC]yC
Quad 11 = O[DC]xC − O[DC]yC CASE 8
Quad 01 = OBD + ODC − O[DC]xC + O[AB]yB
Quad 00 = OAB − O[AB]yB + O[CA]xA
Quad 10 = O[CA]yA − O[CA]xA
Quad 11 = OCA − O[CA]yA + O[DC]xC CASE 9
Quad 01 = OBD + ODC − O[DC]xC + O[CA]xA − O[CA]yA + O[AB]yB
Quad 00 = OAB − O[AB]yB + O[CA]yA
Quad 10 = 0
Quad 11 = OCA − O[CA]xA + O[DC]xC CASE 10
Quad 01 = OBD + ODC − O[DC]xC + O[AB]yB
Quad 00 = O[AB]xB − O[AB]yB
Quad 10 = OCA + OAB − O[AB]xB + O[DC]yC
Quad 11 = O[DC]xC − O[DC]yC CASE 11
Quad 01 = OBD + ODC − O[DC]yC + O[AB]yB
Quad 00 = O[AB]xB − O[AB]yB + O[DC]yC − O[DC]xC
Quad 10 = OCA + OAB − O[AB]xB + O[DC]xC
Quad 11 = 0

CASE 12
Quad 01 = OBD − O[BD]xD + O[AB]yB
Quad 00 = OAB − O[AB]yB + O[CA]xA
Quad 10 = OCA − O[CA]xA + O[DC]yC
Quad 11 = ODC − O[DC]yC + O[BD]xD Thus, it can be seen that by adding and subtracting triangle areas the proportion of a quadrilateral that falls within each bank within a set of four banks can be calculated. The circuitry and methods of the present invention must then include a means for determining the areas of these triangles so that they may be appropriately added and subtracted to obtain coefficients for use in each bank of the two-dimensional resampling filter.

Referring again to FIG. 5, the x coordinate of [AB]y is 0. The y coordinate of [AB]y equals $A_y+(B_y-A_y) * (-A_x)/(B_x-A_x)$, which is equal to $(A_yB_x-A_xB_y)/(B_x-A_x)$. The area of A[AB]yO is then $\frac{1}{2}(A_x[AB]y-A_y[AB]x)$, which can be simplified to OAB * $(A_x)/(B_x-A_x)$.

Note that no part of the four banks is farther from the local origin than one unit along each axis. And, since $A_x$ and $B_x$ are on opposite sides of the y axis, and they therefore have opposite signs, the magnitude of the ratio $(A_x)/(B_x-A_x)$ will always be less than or equal to one. The denominator can never be zero, since $A_x$ and $B_x$ are on opposite sides of the y axis and therefore have opposite signs and cannot be equal. If $A_x$ and $B_x$ were not on opposite sides, vectorAB would not intersect the y-axis.

Reducing the problem to be solved to a simple ratio such as $(A_x)/(B_x-A_x)$ is highly desirable because it involves just two parameters, permitting economy of implementation. If each of these parameters can be adequately defined with just seven bits of information, the resulting ratio can be found from a 16)384×16 lookup ROM. And, since $(B_x)/(B_x-A_x) = 1-(A_x)/(B_x-A_x)$, only one ratio must be calculated directly, and the other can be found by taking an unsigned interpretation of the two's complement of that result, i.e., subtraction from one. Note in FIG. 7 that the edges of no quadrilateral ever intersect the axes more than four times. Thus, four ratios are the maximum that ever need to be calculated (for a four bank-set implementation).

Figure 8A:
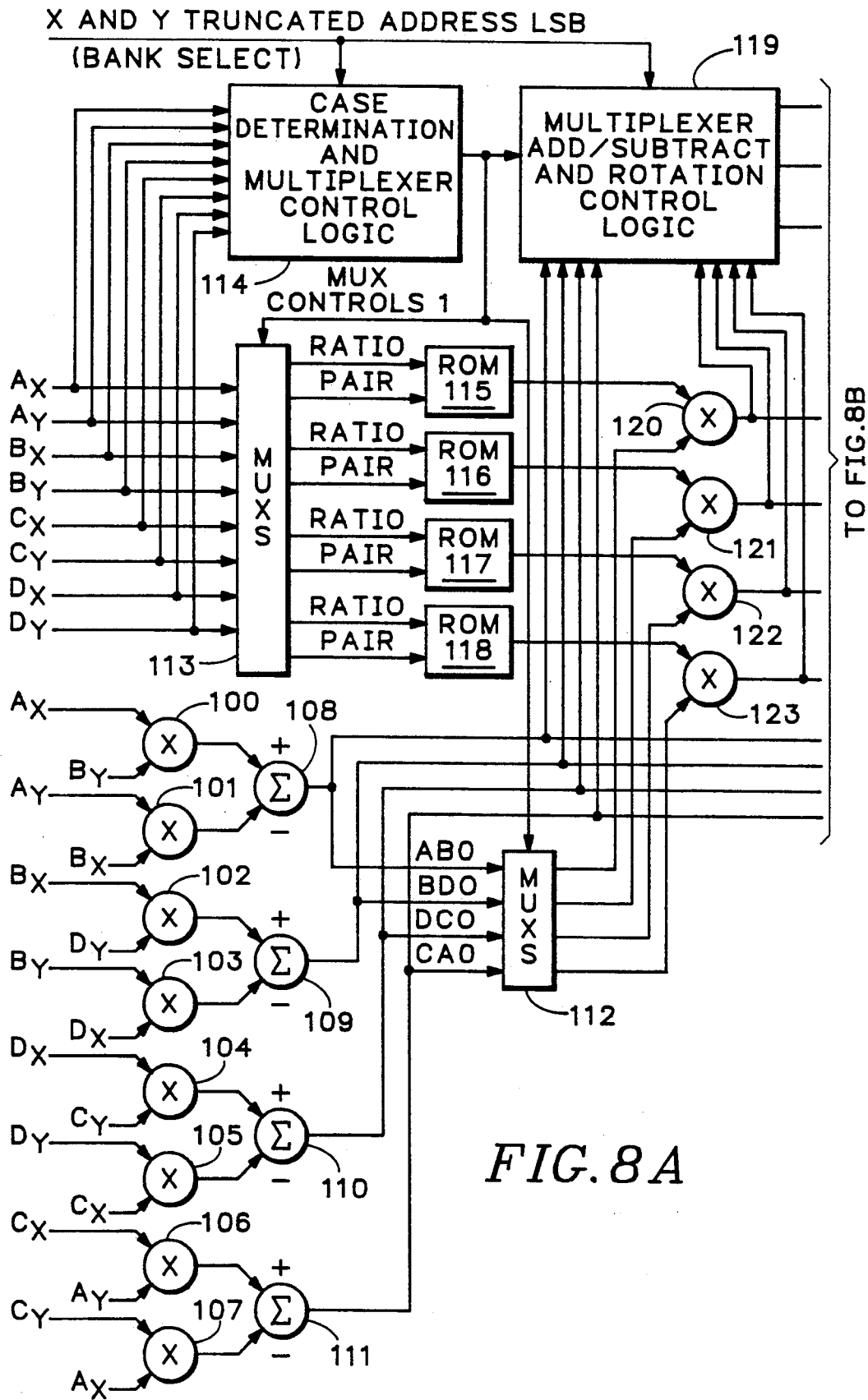
Figure 8B:
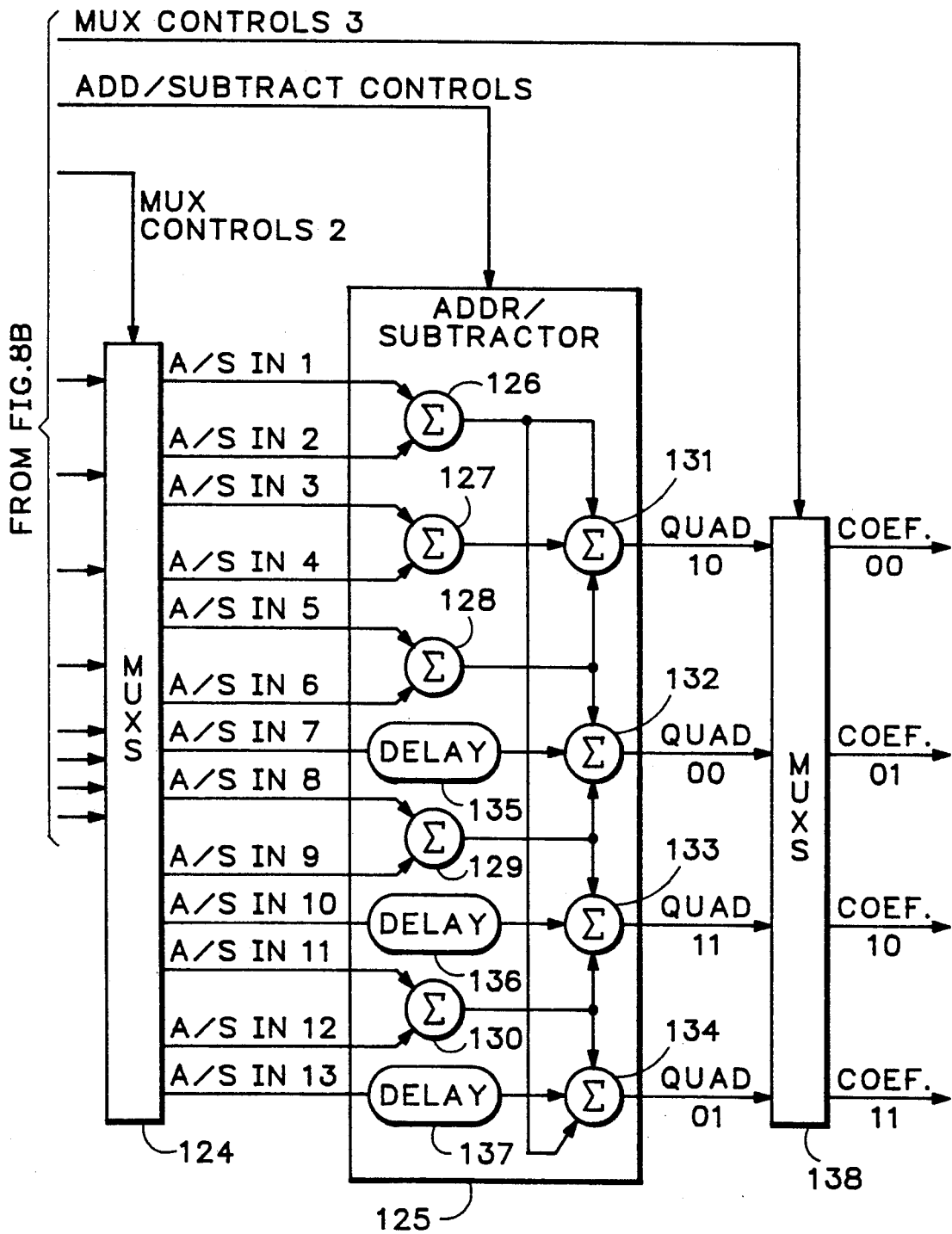

Referring now to, FIGS. 8A and 8B which are a block diagram of the weighting coefficients generator 14, the areas of the primary triangles ABO, BDO, DCO and CAO are calculated by multipliers 100-107 and summing circuits 108-111. For example, $A_x$ and $B_y$ are multiplied together by multiplier 100, $A_y$ and $B_x$ are multiplied together by multiplier 101, and their difference is taken by summing circuit 108 to produce the vector product that is the area of triangle ABO. These double areas are divided by two as they are forwarded to the circuitry downstream by a one digit right-shift in the way the outputs are connected. The outputs of summing circuits 108-111, the areas of the four primary triangles, are routed to multiplexers 112 and 124, and to multiplexer, add/subtract and rotation control logic 119.

The $A_x \ldots D_y$ sub-pixel coordinate signals, which are each 7 bits wide, are supplied to multiplexer 113 and case determination and multiplexer control logic 114, as well as to the multipliers 100-107. The case determination and multiplexer control logic 114 determines from these values and the bank-set select signals (pixel address LSBs) which of the cases shown in FIG. 7 pertains. With that information the multiplexer control logic 114 is able to provide appropriate mux control signals 1 to multiplexers 113 and 112.

At multiplexer 113, the mux control signals 1 causes appropriate pairs of signals from the set $A_x \ldots D_y$ to be applied to read-only-memories (ROMs) 115-118. These pairs of signals are those needed to calculate the ratios, such as the $(A_x)/(B_x-A_x)$ ratio used in the example above, that are needed to obtain the areas of the secondary triangles, such as A[AB]yO from the same example. The values of the ratio pairs select addresses in ROMs 115-118 in which their ratio is stored. These ratios are then produced at the outputs of ROMs 115-118 and applied to the inputs of multipliers 120-123.

Mux control signals 1, representative of which geometric case in FIG. 7 pertains, also control multiplexer 112 so that the primary triangle values on their inputs are switched to appropriate outputs for combining with the ratios from ROMs 115-118 in multipliers 120-123.

The multiplication of the ratios times the primary triangle values produces secondary triangle values at the outputs of multipliers 120-123.

Multiplexer, add/subtract and rotation control logic 119 receives the least significant bits of the x and y truncated addresses, the mux control signals 1 from the case determination and multiplexer control logic 114, the sign bits of each of the primary triangle values from summing circuits 108-111, and the sign bits of each of the secondary triangle values from multipliers 120-123. It uses these signals to generate appropriate mux control signals 2 and 3 and add/subtract control signals. The multiplexer, add/subtract and rotation control logic 119 can be implemented as either logic gates or ROM lookup or other combinational logic means.

Mux control signals 2 and the add/subtract control signals configure multiplexer 124 and the nodes of adder/subtractor 125 to produce the appropriate set of equations from the table of geometric case equations to produce quadrant 00, 01, 10 and 11 signals for the case that pertains.

Each summation circuit 126-134 within the adder/subtractor circuitry 125 can be directed by the add/subtract control signals to either add its inputs, subtract one from the other or vice-versa, pass one of its inputs through unchanged or output a zero. In an alternative implementation, the summation nodes could be less flexible and capable, but more multiplexing would be required to switch signals to summation circuit inputs with the right sign. Two-input summation circuits require two clock cycles to produce their outputs. The three-input summation circuits are actually two two-input summation circuits in series and take four clock cycles to produce a result. All but three of the paths through the adder/subtractor circuitry are then six clock cycles long, while the path from inputs A/S IN 7, A/S IN 10 and A/S IN 13 to summation circuits 132, 133 and 134, respectively, would only be four clock long if delay elements 135, 136 and 137 were not included to add two clock cycles of delay on those paths.

The following Table of Adder/Subtractor Inputs shows which terms are applied to which of the inputs of the adder/subtractor 125. Note that some of these inputs are always the same when they are used at all. Given the capability of the adder/subtractor nodes 126-134 to ignore an input, these signal lines do not require multiplexing to achieve the zero state shown, but rather can be hard-wired with the signal they always produce and ignored to achieve the blanks shown in this table. The values in this table are unsigned, but the signs to make up the equations shown in the Table of Geometric Case Equations above are supplied by the add/subtract control signals.

| TABLE OF ADDER/SUBTRACTOR INPUTS | | | | | | | | | | | | |
| --- | --- | --- | --- | --- | --- | --- | --- | --- | --- | --- | --- | --- |
| Case: | 12 | 11 | 10 | 9 | 8 | 7 | 6 | 5 | 4 | 3 | 2 | 1 |
| A/S IN: | | | | | | | | | | | | |
| 1 | | | dx | dx | dx | dx | | | | dx | | |
| 2 | bx | | | cx | | | | | a | a | a | a |
| 3 | b | b | b | b | b | b | b | b | b | b | b | b |
| 4 | d | d | d | d | d | d | d | d | d | d | d | d |
| 5 | dy | ay | ay | ay | ay | ay | ay | ay | cy | cy | cy | c |
| 6 | | dy | | cy | | | dy | dy | dy | | dy | |
| 7 | a | | | a | a | a | a | a | | | | |
| 8 | cx | ax | ax | | cx | cx | cx | c | cx | cx | c | |
| 9 | | dx | | | | | dx | | dx | | | |
| 10 | c | c | c | | | c | c | | c | c | | |
| 11 | dy | | dy | | | dy | | | | dy | | |

-continued

TABLE OF ADDER/SUBTRACTOR INPUTS

| 12 | a | a | cy | | |
|----|---|---|----|---|---|
| 13 | d | dy | c | c | dx |

Where:  a = OAB,  b = OBD,  c = ODC,  d = OCA,
ax = O[AB]xB  bx = O[BD]xD  cx = O[CA]xA  dx = O[DC]xC
ay = O[AB]yB  by = O[BD]yD  cy = O[CA]yA  dy = O[DC]yC Mux control signals 3 causes multiplexer 138 to put the appropriate coefficients on the output for each of the four types of bank 00, 01, 10 and 11. To do this, the multiplexer, add/subtract and rotation control logic 119 needs to consider which type of bank was to be to the upper left of the translated origin and which sub-case pertained, so that it can direct multiplexer 138 to put the appropriate coefficients on each of its output lines. Referring again to FIG. 4, the four coefficients generated by the weighting coefficients generator 14 shown in FIG. 8 are applied to the respective banks of the two-dimensional resampling filter 16.

Figure 9B:
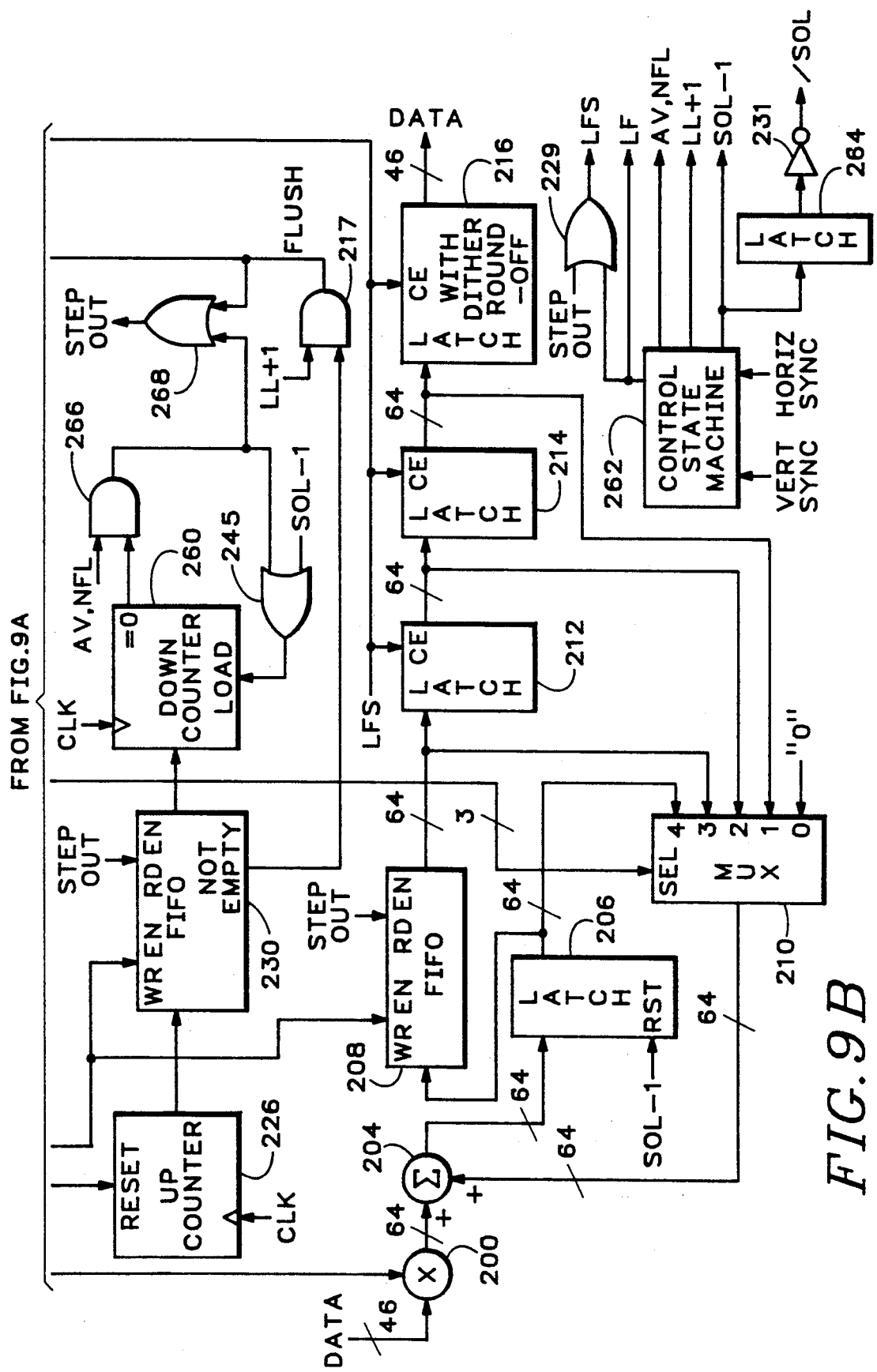

One of the four identical banks of the filter is shown in FIGS. 9A and 9B. The four banks all receive the same data information and the addresses as explained above. Multiplier 200 is actually four separate multipliers, one for luminance data, one for chrominance data, one for keying data and one for depth data. The 46 bits of incoming data shown entering multiplier 200 contain 10 bits of luminance (Y) data, 10 bits of chrominance (C) data, 10 bits of keying (K) data and 16 bits of depth (Z) data.

The 12 bits of coefficient data arriving at sign/absolute value separator 202 are separated into 1 bit of sign information and 11 bits of the absolute value of the coefficient. The incoming address data contains 9 bits of x and 8 bits of y, with the least significant bit of the pixel part of each having already been used for bank-set selection. The sign bit from the coefficient data is combined with this address data to distinguish between front and back sides of the image in the event of folding. Remember from the discussion above that the front of the image produced a negative value in the vector multiplication process, while the back produced a positive sign. In the discussion of the odd and even field memories 18 and 20, below, it will be seen that this bit is used to keep the front and back images stored in separate memories.

The multiplier 200 multiplies each portion of the data, Y, C, K and Z, by the 11 bits of coefficient data and produces results having 21 or 27 bits, and the results are then each rounded with dithering to 16 bits. Effective dithering techniques are well known in the art, and suitable ones are discussed at pages 164–175 of "Digital Coding of Waveforms" by Jayant and Noll, published by Prentice-Hall, 1984, hereby incorporated by reference. The resulting 64 bits of data, in four channels of 16 bits each are presented to the summation circuitry 204 at the same time that the address emerges from delay element 219 and is presented to latch 220. That is, delay element 219 matches the delay through the multiplier 200 with dither round-off.

It should be noted that latches 206, 212, 214 and 216 are all actually four sets of latches, each for one type of data, Y, C, K and Z. Summation circuit 204 has a zero clock delay, so on the next clock after new data appears at its input, the sum of that new data and the output of multiplexer 210 appears on the output of latch 206.

The control state machine 262 (lower right of FIG. 9B) receives vertical and horizontal sync information, and produces four output signals: LF (line flush), AV,NFL (active video, not first line), LL+1 (last line plus one) and SOL−1 (start of line minus one). SOL−1 becomes /SOL (not start of line) after passing through delay latch 264 and inverter 231. The timing of the SOL−1 and SOL signals is adjusted for the delays presented by multiplier 200 on the data path and the corresponding delay 219 on the address path. The signal LF is active high for the first three clock cycles after the end of each line of video, so that latches 232, 234, 236, 254, 256, 258, 212, 214 and 216 can be flushed out. LF is ORed with the signal "step out" by OR gate 229 to produce the signal LFS (line-flush/step) to accomplish this, as well as normal within-the-line behavior. AV,NFL is active during lines of video except the first line, but not during vertical or horizontal sync intervals. SOL−1 is active during horizontal sync intervals.

During the horizontal sync interval, the active SOL−1 signal resets single bit latch 254 and prevents the decoder 252 from simultaneously setting it by disabling inverted input AND gate 255. The active SOL−1 signal also sets single bit latches 256 and 258 through OR gates 257 and 259, respectively. As will be further explained below, these single bit latches 254, 256 and 258 are normally used to keep track of which data has been used during accumulations of data from previous lines. The active SOL−1 signal also causes a high output of OR gate 245, loading down counter 260 with the output, if any, of FIFO 230. The active SOL−1 also resets latch 206 (on the data path).

However, since we are initially going to examine the behavior of the two-dimensional resampling filter 16 during the first line of a field of video, the normal behavior of these single bit latches 254, 256 and 258, as well as the address latches 232, 234 and 236, the data latches 212, 214 and 216, and the outputs of the FIFOs 228, 230 and 208 will be blocked for now. This is because during the first line of a new field of video, the signal AV,NFL is inactive low disabling AND gate 266 on the =0 output of down counter 260 so that the normal source of "step out" signals from OR gate 268 is not asserted. That means that no source of "step out" signals is available, since the alternative source on the input of OR gate 268, the flush signal, only occurs during the last line plus one. And, with no LF signal, no "step out" signals also means no LFS signals to clock enable the aforementioned circuitry. Note also that AND gate 217 is also disabled at this time by the inactive low on LL+1. With no "step out" signals available, none of the latches 232, 234, 236, 254, 256, 258, 212, 214 or 216 can be clock enabled, and they thus cannot shift their contents to the right, as they normally do on the clocks following a "step out" signal.

The inactive AV,NFL signal also disables AND gates 244, 246 and 248 to ensure that no spurious outputs of compare circuits 238, 240 or 242 produce active inputs at the inputs of the priority encoder 250.

During the clock cycle that data is first arriving at the inputs to latches 220 and 206, SOL−1 becomes inactive low and SOL goes to active high. Therefore, /SOL, the not start of line signal, is low at the inputs to AND gates 223 and 227, disabling them. The resulting low output of AND gate 223 is inverted by inverter 224 to reset up counter 226. The low output of AND gate 227 write disables FIFOs 228, 230 and 208.

On the next clock, latch 206 presents the output of the summation circuit 204 to the input of FIFO 208 and the "4" input of multiplexer 210. On that same clock the present address on the input of latch 220 is latched and becomes previous data on its output, where it is presented to the input of FIFO 228.

For this clock cycle and the rest of this line, SOL is inactive low and /SOL goes high. The high inputs to AND gates 223 and 227 enable them. The output of AND gate 223 is now controlled by the output of compare circuit 222, while the output of AND gate 227 is controlled by the inverted output of the same circuit (via inverter 225).

If the address at the input of latch 220 is different than the address on its output, the output of compare circuit 222 is low, and this low is inverted by inverter amplifier 224, so that the up counter 226 is reset. The low output of AND gate 223 leaves the "4" input of the priority encoder 250 inactive low. Since we are still in the first line of a new field of video, AND gates 244, 246 and 248 are all producing zeros as a result of the low state of AV,NFL, so that the "3", "2" and "1" inputs to the priority encoder 250, as well as the "4" input, are all low. Thus, the output of the priority encoder 250 is "000" and multiplexer 210 has its "0" input (which is "0" selected. Therefore, on the next clock the output of latch 206 is written into FIFO 208 and the output of the summation circuit 204 with zero added, is clocked into latch 206.

If the address at the input of latch 220 is the same as the address on its output, i.e. the present quadrilateral pixel address in the destination coordinate system is the same as the previous quadrilateral pixel address in the destination coordinate system, the output of compare circuit 222 is high, and this high is inverted by inverter amplifier 224, and the up counter 226 is not reset by the resulting low. The high output of the compare circuit 222 is inverted by inverter 225, so that AND gate 227 is not satisfied. The low output of AND gate 227 is an inactive "step in" signal that does not write enable FIFOs 228, 230 and 208.

The high output of compare circuitry 222 also goes to priority encoder 250 through AND gate 223, so that the output of the priority encoder 250 is "100". The "100" output of the priority encoder 250 directs multiplexer 210 to select input "4", which is the contents of latch 206, the previous data. The contents of latch 206 is added to the output of multiplier 200. Thus, when the present quadrilateral pixel address is the same as the previous quadrilateral pixel address, the data associated with these two addresses is accumulated by summation circuit 204.

So long as the input pixel address remains the same, incoming data will continue to be accumulated in latch 206, no "step in" signal is generated and no data enters the FIFOs 228, 230 and 208. However, during this time, up counter 226 is counting the number of incoming quadrilaterals whose data is being accumulated in latch 206.

When the address at the A input of compare circuitry 222 no longer matches the previous address on the B input, the resulting low on the output of the compare circuitry 222 is inverted by inverter 225 to produce an active "step in" signal out of AND gate 227. The low on the output of the compare circuitry 222 produces a low output of AND gate 223 and causes the "4" priority to go inactive at the input to the priority encoder 250, allowing it to respond to the next lowest priority on its inputs.

However, while the two-dimensional filter 16 is processing the first line of a new field of video, AV,NFL is inactive low and AND gates 244, 246 and 248 are disabled, so no priorities "3", "2" or "1" ever occur. Consequently, whenever the incoming pixel address changes and comparator 222 is not satisfied, the priority from the priority encoder changes from "100" directly to "000". Priority "000" causes multiplexer 210 to select its "0" input, thereby placing all zeros on its output, so that only "0" is added to the output of multiplier 200. This is the desired behavior, since this is an initial data value in the new output pixel, and there is no previous line data to accumulate it with.

An active "step in" write enables all of the FIFOs 228, 230 and 208, so that the next clock causes the output of up counter 226 to be stored in FIFO 230, the previous address in latch 220 to be stored in FIFO 228, and the accumulated data on the output of latch 206 to be stored in FIFO 208. The active "step in" signal also resets the up counter 226 on that same next clock.

The content of the up counter 226 that is stored in FIFO 230 represents the number of contiguous quadrilaterals in a particular line of incoming quadrilaterals that impinged on the present pixel. As will be further explained below, during the next line of video the numbers stored in FIFO 230 are read out and used to keep the present line synchronized with the preceding line.

As the first line of incoming quadrilaterals is traversed, successive accumulations within the bank of pixels continues and partial results, including address, data and counter contents, are stored for each output pixel address. After the end of that first line of incoming quadrilaterals, AV,NFL becomes active during each line of video, but not during the horizontal blanking intervals between lines. While AV,NFL is active high, AND gate 266 is enabled, permitting "step out" signals to be initiated by the "=0" output of down counter 260. Also, while AV,NFL is active high, AND gates 244, 246 and 248 are all enabled, permitting normal operation of priority inputs to the priority encoder 250 under the control of compare circuits 238, 240 and 242.

At the beginning of the next line of incoming quadrilaterals, SOL−1 and SOL will perform the same initialization functions that they did on the first line. SOL−1 resets latches 220 and 206 and single bit latch 254, as well as setting single bit latches 256 and 258. Also on this second line, down counter 260 continues to produce a high "=0" output because it has zero contents since it was loaded by the SOL−1 induced output of OR gate 245 during a time when FIFO 230 was not read enabled. On the first line, the output of the down counter 260 was blocked at AND gate 266 by the absence of an active high AV,NFL signal. On this line, however, that high output passes through enabled AND gate 266 and OR gate 268 to create an active high "step out" signal.

Active high "step out" signals read enable the FIFOs 228, 230 and 208. An active "step out" signal also passes through OR gate 229 to produce LFS, which clock enables latches 232, 234, 236, 254, 256, 258, 212, 214 and 216. The next clock then reads out the first-in contents of the FIFOs 228, 230 and 208 from the preceding (first)

line into latch 232, down counter 260 and latch 212, respectively.

The down counter 260 now counts down from the number stored on the last line, representing the number of contiguous quadrilaterals that were summed to produce the first data accumulation at the first pixel address. When it reaches zero another "step out" signal is produced, and, on the next clock, more data is read out of the FIFOs 228, 230 and 208 into latch 232, down counter 260 and latch 212, respectively. At the same time, the previous contents of latches 232 and 212 are latched into latches 234 and 214, respectively. Thus, the addresses and data from the previous line are right shifted through the address latches 232, 234 and 236 and data latches 212, 214 and 216, respectively, according to the position on the present line dictated by the number of clocks that have occurred on the present line, thereby keeping the addresses and data of the last line synchronized with the current location on the present line.

Figure 10:
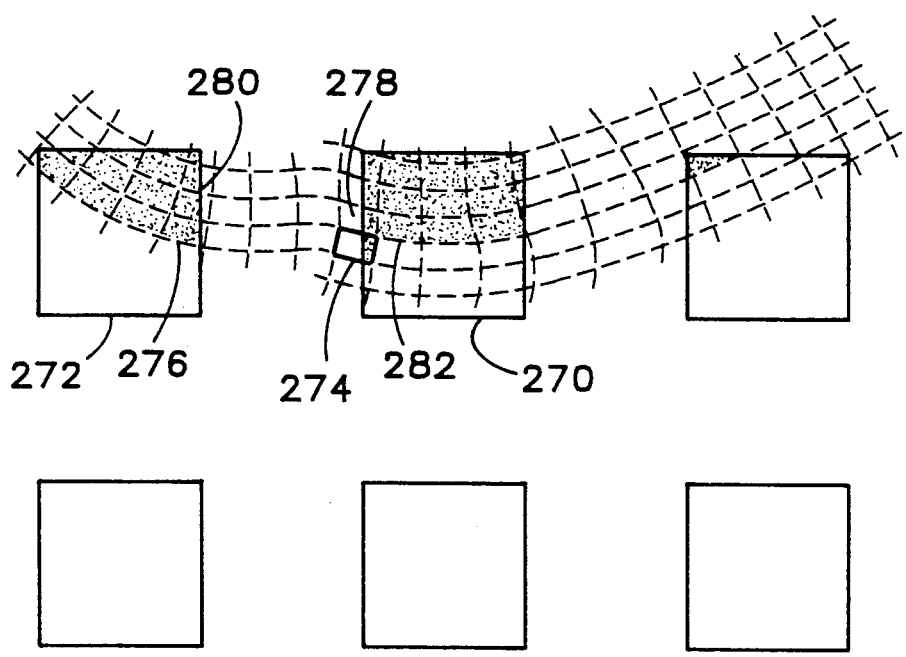
FIG. 10 is an illustration of how one bank of the two-dimensional resampling filter receives the mapped quadrilaterals of the source video.

Referring now to FIG. 10, six adjacent output pixels in the same bank are shown, with the blank areas between them understood to be covered by the pixels associated with other banks in the set of four. The present quadrilateral 274 is shown within solid lines, while the rest of the quadrilaterals shown are only marked by their corners. The present quadrilateral 274 is the first one on the present line of quadrilaterals to map into the present output pixel 270. The last-in data stored in the FIFOs 228, 230 and 208 of FIGS. 9A and 9B are from the same line of quadrilaterals as it crossed the preceding output pixel 272. That set of accumulated data was stored in those FIFOs when the next quadrilateral after 276 had a different address and therefore produced a "step in" signal.

Referring now to FIGS. 9A and 9B as well as FIG. 10, the data from the present quadrilateral 274 should be accumulated into the same accumulation as the quadrilateral directly above the present one, quadrilateral 278 and the rest of the quadrilaterals in that line of quadrilaterals that fell within this output pixel. When the present address input is for quadrilateral 274, the address of quadrilateral 280 is on the input of latch 232, the address of quadrilateral 278 is on the input of latch 234, and the address of quadrilateral 282 is on the input of latch 236. Thus, A equals B on the inputs of compare circuitry 240. Let us assume that single bit latch 256 is not set, and that therefore its /Q output is high satisfying AND gate 246.

Under these conditions, the outputs of compare circuits 222 and 238 will be false, since the incoming address just changed and the address on the A input of compare circuitry 238 is different from the one that matched the present address on the next compare circuit 240. Accordingly, the "4" and "3" inputs to priority encoder 250 are false and the "2" input is true, so the encoder output is "010". An encoded priority of "010" causes multiplexer 210 to select input "2", which is connected to the input of latch 214, as its output. Therefore, the data accumulation stored in latch 212 and associated with the address stored in latch 232 is added to the new data at this pixel address by the accumulator 204. Thus, data from the preceding line having the same output pixel address is accumulated with the first input quadrilateral data for the same output pixel address on the present line.

Sometimes the first occurrence of the same pixel address on the previous line will lead or lag by one accumulation location, but in that case the address match will be detected by comparator 238 or comparator 242 instead of comparator 240. But the same result occurs by the encoding of priority "3" or priority "1" instead of priority "2", and multiplexer 210 selection of latch 212 or latch 216 instead of latch 214.

The used data latches 254, 256 and 258, when they are set, prevent the re-use of the used data associated with them by failing to enable the corresponding AND gates 244, 246 and 248, respectively, with their /Q outputs. When data from previous lines is accumulated into the new data on the present line by an encoded "3", "2" or "1" from the output of the priority encoder 250, it is important to keep track of that fact so that data that has been used once is not reused. Therefore, the output of the priority encoder 250 is monitored by decoder 252, and its "1", "2" are and "3" outputs used to set single bit latches 258, 256 or 254, respectively, depending on which priority produced the accumulation. A set latch 254, 256 or 258 disables the corresponding AND gate 244, 246 or 248 that an A = B output from one of the comparators 238, 240 or 242 must pass through in order to generate a corresponding priority at the priority encoder 250.

Like the address latches 232, 234 and 236, and the data latches 212, 214 and 216, the single bit used data flag latches 254, 256 and 258 are clock enabled by the LFS signal and clocked by the system clock. Thus, the used data flags will march along to the right through these single bit latches 254, 256 and 258 in step with the corresponding address and data information.

When data from a preceding line of input quadrilaterals reaches latch 216 and it has not been summed into any accumulation on the present line, it is final data ready for output. If this data has not been used, used data latch 258 is not set and its /Q output is high, enabling AND gate 218. When AND gate 218 is enabled, the next LFS signal passes through it and through OR gate 219, and is latched into latch 241 to become an "output enable" signal to the odd and even field memories 18 and 20 (FIG. 4). The address in latch 236 is also presented to the odd and even field memories 18 and 20, where it is used as their address inputs.

Latch 241 is clock enabled by LFS and reset by the output of AND gate 235. LFS is active each time data is to be output, as described above. AND gate 235 is only enabled by SOL − 1 during the horizontal blanking interval, when the output of AND gate 235 is needed to reset latch 241 after LFS goes inactive and its inverted complement produced by inverter 233 serves to produce an active output of the AND gate 235.

The initialization of the used data single bit latches 254, 256 and 258 was discussed above. Latch 254 was initialized to reset and latches 256 and 258 were initialized to set by the start of line minus one signal, SOL − 1. Because at the beginning of a line there is no meaningful data in latches 212, 214 and 216 since they were flushed at the end of the last line, the used data latches 256 and 258 associated with these data latches are marked as used to ensure that they will not be accumulated into any totals. And, since meaningful data is present at the FIFO 208 output, the used data latch 254 associated with latch 212 is reset.

When the last line of quadrilaterals has been processed, all of the data in FIFO 208 is final data ready for output, in that there is no more data to accumulate with it. After the last line, the signal LL + 1 goes active, enabling AND gate 217. So long as there is still data in FIFO 230, indicating that there is also still data in FIFOs 228 and 208, the signal not empty from FIFO 230 will satisfy AND gate 217 generating a flush signal. The flush signal passes through OR gate 268 and becomes a constant "step out" signal, which in turn produces a constant LFS signal clock enabling all of the latches 232, 234, 236, 254, 256, 258, 212, 214 and 216. The "step out" signal also read enables all of the FIFOs 228, 230 and 208. Successive clocks then read out the contents of the FIFOs 228 and 208, and clock them through the latches 232, 234 and 236 on the address path and latches 212, 214 and 216 on the data path. FIFO 230 is enabled but not read out, since there are no further load signals from AND gate 266.

Figure 11:
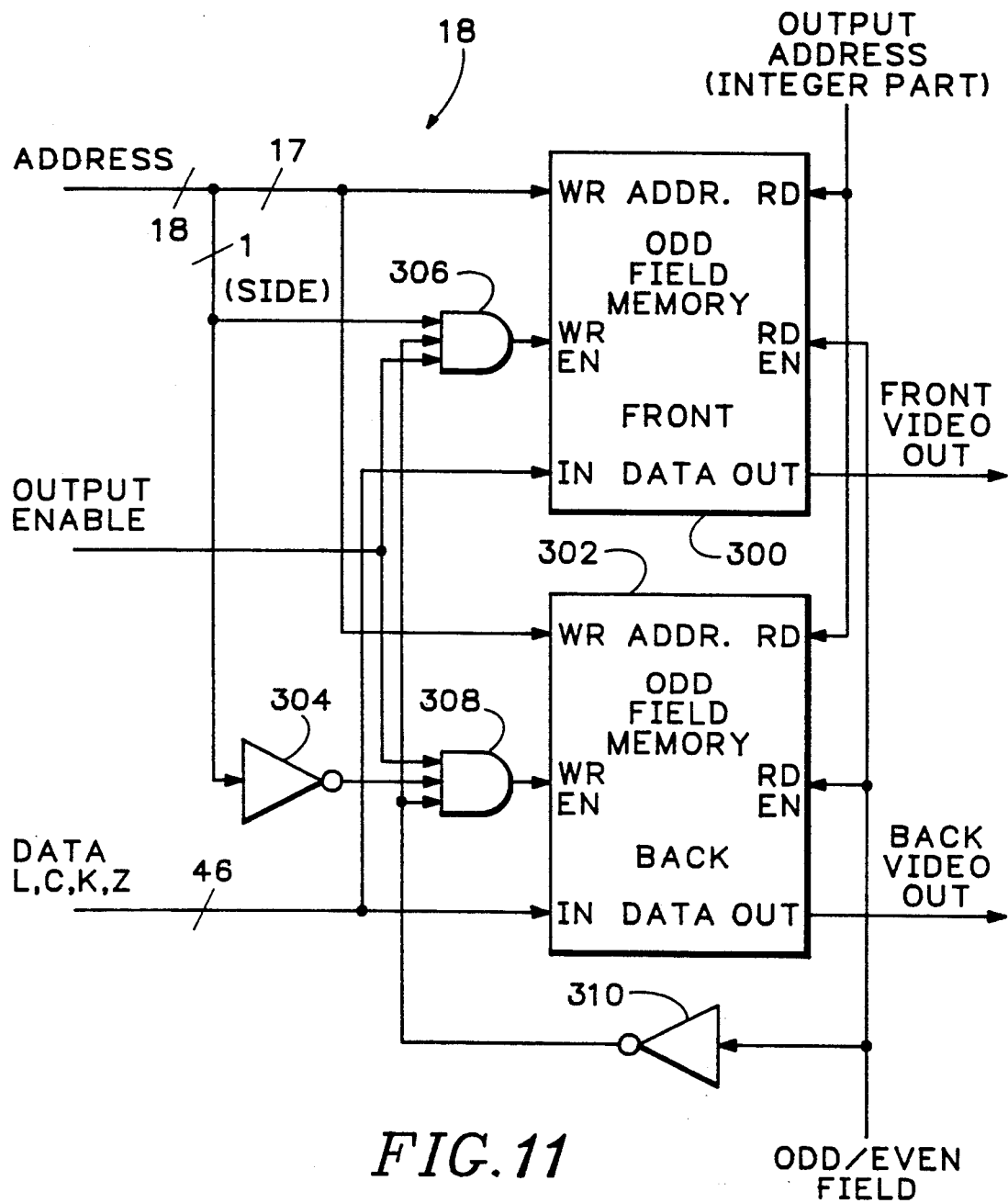
FIG. 11 is a block diagram of a first version of the field memory that only keeps track of front and back sides.

Referring now to FIG. 11, a first version of the odd field memory 18 shown in FIG. 4 only keeps track of the front and back of a single layer of video. The incoming address data from the two-dimensional resampling filter 16 includes 9 bits of x, 8 bits of y and one bit of side information derived from the sign bit of the coefficient data. Recall from the discussion above that if the side bit is one (negative), the view is of the front of the picture, and if the side bit is zero (positive), the view is of the back of the picture.

The odd/even field signal selects back and forth between odd field memory 18 and even field memory 20, such that when one of them is enabled for reading, the other one is disabled for reading. Inverter amplifier 310 supplies an inverted version of the odd/even signal to AND gates 306 and 308, enabling the write enable inputs of the front and back odd field memories 300 and 302 when the read enables are disabled. The side bit is "1", active high, when the front of the image is being processed. Thus, when the odd field memory 18 is disabled for reading by a low odd/even field signal and that signal is inverted by inverting amplifier 310, and the side bit is high, indicating that the front of the image is being processed, a high output enable signal satisfies AND gate 306 and the write enable input to front odd field memory 300 is enabled. Inverter amplifier 304 inverts a low side bit, indicating the back of the signal is being processed, into a high that enables AND gate 308. So, when the odd field memory 18 is disabled for reading by a low odd/even field signal and that signal is inverted by inverting amplifier 310, and the side bit is low, indicating that the back of the image is being processed, a high output enable signal satisfies AND gate 308 and the write enable input to the back odd field memory 300 is enabled.

When the odd/even field signal goes high, enabling reading of the front and back odd field memories 300 and 302, the inverted version of the odd/even signal from the output of inverter amplifier 310 disables both AND gates 306 and 308 so that no writing to either the front or back odd field memories 300 and 302 can occur. Even field memory 20 operates the same way as odd field memory 18, except that the odd/even field signal that it receives is of the opposite phase and therefore the timing of reads and writes is reversed.

Figure 6B:
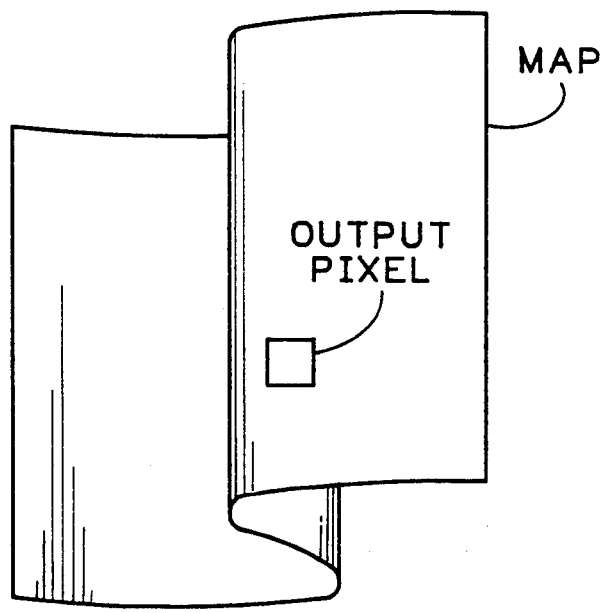
FIG. 6B is an illustration of how a double fold of the mapped input image can produce three layers in an output pixel.

Referring now to FIG. 6B, a doubly folded map produces three layers of input video, all mapped to one output pixel location. To adequately deal with this case a field memory more complicated than that shown in FIG. 11 is required.

Referring now to FIG. 12, a second version of the odd field memory 18 shown in FIG. 4 keeps track of multiple layers of video image, figuring out which is on top and calculating mixtures of those layers that are not the top layer as dictated by keying values. The address associated with new data is applied first to the read addresses of both the top and bottom field memories 320 and 322, and then, after a suitable delay to the write addresses of those same memories. The read and write enable circuitry is not shown in FIG. 12, but operates very similarly to that shown in FIG. 11, except that no side signal is included and the write enable signal should be delayed as the read address is.

The read address and enable cause the present contents of both the top and bottom field memories 320 and 322 at that address to be read out. All of the data from the top field memory 320 is applied to the 0 input of multiplexer 338 and the 1 input of multiplexer 344, while only the Z component is applied to the B input of comparator 328. All of the data from the bottom field memory 322 is applied to the 0 input of multiplexer 340, while only the Y, C and K components are applied to the 1 input of multiplexer 342 and only the Z component is applied to the B input of comparator 332.

All of the arriving new data is applied to the 1 inputs of multiplexers 338 and 340, while only the Y, C and K components are applied to the 0 input of multiplexer 342 and only the Z component is applied to the A inputs of comparators 328 and 332. The K component of the new data arriving at the left of FIG. 12 is checked to see if it is non-zero, where zero represents complete transparency and one represents complete opacity, by not-equal-zero checker 326. If K equals zero, the desired outcome is to ignore it and replace the corresponding top video with itself and the bottom video with itself.

If the K value is zero, the output of not-equal-zero checker 326 is low and AND gates 330 and 336 are disabled. The low output of AND gate 336 also disables AND gate 337. Low outputs from AND gates 330, 336 and 337 select the "0" inputs of multiplexers 338, 340, 342 and 344 as their outputs. The "0" input of multiplexer 338 is the data from the top field memory 320, and the output of multiplexer 338 goes back to the input of that same memory, thereby accomplishing part of the desired outcome.

The 0 input of multiplexer 340 is the data from the bottom field memory 322 and its output goes to the 0 input of multiplexer 344, which is also selected. Since the output of multiplexer 344 gets mixed with some portion of the Y, C and K components of the output of multiplexer 342 and then placed in the bottom field memory 322, this bottom data is also going back into the memory that it came from after this mixing. And, this mixing leaves the bottom data unchanged, since by definition transparent video has zero values for Y, C and K. Thus, the product of multiplying these zeros by any value is more zeros, so the bottom video has nothing added to it.

For any other, non-zero, value of K, AND gates 330 and 336 are enabled and how the different layers of video get arranged is determined by their Z values. Let us first examine the case where the new data has the largest Z value, indicating that the new data is farthest from the viewer. In this case, the desired result is to leave the top layer data in the top field memory 320, and to mix the new data with the bottom layer to the extent that it is visible through it.

When the Z value of the new data is larger than the Z value of the bottom data, the outputs of both comparators 328 and 332 are low. A low output from comparator 328 fails to satisfy AND gate 330 and its low output then selects the 0 input of multiplexers 338 and 344 as their outputs. The selection of the 0 input of multiplexer 338 permits the data from the output of the top field memory 320 to be returned to its input.

A low output from comparator 332 fails to satisfy AND gate 336, which then fails to satisfy AND gate 337. The low output of AND gate 337 selects the 0 input of multiplexer 340 as its output. The 0 input of multiplexer 340 is the data from the bottom field memory 322. The output of multiplexer 340 is the selected 0 input of multiplexer 344, so the bottom layer data will be returned to the bottom field memory after mixing with output of multiplexer 342.

The low output of AND gate 336 selects the 0 input of multiplexer 342 as its output. The 0 input to multiplexer 342 is the new data, as was the desired outcome. The Y, C and K components of the new data are multiplied by the quantity 1-$K_{bottom}$ generated by summing circuit 346 at multiplier 348. The results are summed with the corresponding Y, C and K components from multiplexer 344 by summing circuit 350. The output of summing circuit 350 is the input to the bottom field memory 322.

The general form of the formula by which two video signals are mixed together based on the K value of the top layer is:

$$\text{Result} = \text{Top} + (1 - K_t) * \text{Bottom}$$

for K=0 describing completely transparent and K=1 describing completely opaque. This is the formula implemented by summation circuits 346 and 350 and multiplier 348.

Let us next examine the case where the Z value of the new data is intermediate between the Z value of the top data and the Z value of the bottom data. In this case, the desired outcome is to leave the top data in the top field memory 320, but store the new data as bottom data with the old bottom data showing through by an amount determined by the K value of the new data.

When the Z value of the new data is less than the Z value of the bottom data, the output of comparator 332 is high, satisfying AND gate 336. A high output from AND gate 336 enables AND gate 337 and selects the 1 input of multiplexer 342 as its output. Since the Z value of the new data is greater than the Z value of the top data, the output of comparator 328 is low. The low output of comparator 328 fails to enable AND gate 330, and its low output consequently selects the 0 inputs of multiplexers 338 and 344 as their outputs. Multiplexer 338 will then return the top data to the top field memory 320, as desired.

The low output of comparator 328 is also inverted by inverter amplifier 334, satisfying the AND gate 337. The high output of AND gate 337 selects the 1 input of multiplexer 340 as the multiplexer's output. The 1 input of multiplexer 340 is the new data, so it is the new data which is on the selected 0 input of multiplexer 344. Thus, the new data, with some of the bottom data mixed in according to the K value of the new data, will become the new bottom data, as desired.

Finally, let us examine the case where the new data has a smaller Z value than the top data. The desired outcome in this case is that the new data replaces the top data in the top field memory 320, and the top data, with some portion of the bottom data showing through according to the K value of the old top data, replaces the bottom data.

When the Z value of the new data is less than the Z values of the top data, both comparators 328 and 332 will have high outputs. The high output of comparator 328 satisfies AND gate 330, whose high output then selects the 1 input of multiplexers 338 and 344 as their outputs. The 1 input of multiplexer 338 is the new data, so it will replace the top data in the top field memory 320, as desired.

The high output of comparator 332 satisfies AND gate 336, thereby enabling AND gate 337 and selecting the 1 input of multiplexer 342 as its output. The high output of comparator 328 is inverted by inverter amplifier 334, whose low output then fails to satisfy AND gate 337. The low output of AND gate 337 selects the 0 input of multiplexer 340 as its output. The 0 input to multiplexer 340 is the bottom data, but the output of multiplexer 340 is the non-selected input to multiplexer 344. The selected 1 input of multiplexer 344 is the top data, which will therefore replace the bottom data, with some of the old bottom data from multiplexer 342 mixed in according to the K value of new bottom (old top) data.

It was stated above that the mapping was subject to the restriction that it be piecewise continuous, which is to say continuous locally over regions within each of which the transfer function from input frame to output frame is continuous, while between such regions there may be discontinuities. The question then naturally arises: How are discontinuities treated?

If a discontinuity causes part of the area of an output pixel not to receive any quadrilaterals, the values associated with that pixel will be diminished by the amounts that are missing, thereby allowing part of whatever is behind that pixel in depth to leak through when the layers are combined with other layers, e.g. as shown in FIG. 12.

The restriction that no side of any pixel is allowed to be more than 1/sqrt2 (one over the square root of two) of its former size, guarantees that no more than four output pixels are ever impinged upon by a quadrilateral from the source coordinate system. With no more than four destination coordinate system pixels ever receiving a quadrilateral from the source coordinate system, the hardware of the system of the present invention has been kept simple and efficient. This restriction could be lifted, if so desired, by increasing the number of coefficients generated by the weighting coefficient generator, and adding more banks of two-dimensional resampling filters and odd/even field memories.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

We claim:

1. A method for mapping a video image in a first two-dimensional plane into a video image in a second two-dimensional plane according to an arbitrary mapping function, the method comprising the steps of:
   mapping addresses of the video image in the first two-dimensional plane into the second two-dimensional plane to produce quadrilateral addresses;
   translating an origin to produce sub-pixel addresses, pixel addresses and bank-set selection signals from the quadrilateral addresses;
   generating weighting coefficients indicative of an area of a quadrilateral that is within each of a plurality of banks, the weighting coefficients being generated from the bank selection signals and the sub-pixel addresses;

using the generated coefficients and the pixel addresses to produce video data and video addresses in the second two-dimensional plane; and organizing the video data and video addresses in the second two-dimensional plane to produce the video image in the second two-dimensional plane.

2. A method according to claim 1 wherein the generating weighting coefficient step comprises:

determining which of a plurality of geometric cases pertains from a relationship between the sub-pixel addresses and bank-set selection signals;

ascertaining secondary triangle ratios from appropriately selected sub-pixel addresses based on the determined case;

calculating primary triangle areas ABO, BDO, DCO and CAO from the sub-pixel addresses;

multiplying the primary triangle areas by the secondary triangle ratios according to the determined case to obtain secondary triangle areas; and combining primary triangle areas with secondary triangle areas according to the determined case to obtain coefficients indicative of the area of a quadrilateral that is within each of the plurality of banks.

3. A method according to claim 1 wherein the using step comprises the steps of:

multiplying video data by an associated generated coefficient to produce a weighted video data element;

identifying same pixels from the pixel addresses to produce a same pixel signal;

accumulating weighted video data elements associated with the same output pixel into a running total based on the same pixel signal;

determining when there is no additional data associated with an output pixel; and outputting a video address in the second two-dimensional plane and associated video data from the running total when it is determined that there is no additional data associated with that output pixel.

4. A method according to claim 3 wherein the step of identifying same pixels comprises the steps of:

latching a previous address; and comparing the previous address with a current address to produce a same pixel signal when the previous address and the current address are equal.

5. A method according to claim 3 wherein the accumulating step comprises the steps of:

summing weighted video data elements associated with the same pixel together into a line running total according to the same pixel signal;

storing the line running total, an associated pixel address, and a count representing how many quadrilaterals on the present line contributed to the line running total; and recalling the line running total from a previous line when a line running total on a present line should include a line running total on a previous line in order to produce a complete line running total.

6. A method according to claim 5 wherein the step of recalling the line running total comprises the steps of:

reading out the stored line running total and associated pixel address and the count while at a location on the current line corresponding to a location of the stored line running total on the previous line;

ascertaining from the read out contents whether any of the associated pixel addresses from the previous line are the same as the present address on the current line;

presenting the line running total associated with the associated pixel address for summation when one of the associated pixel addresses is the same as the present address on the current line; and counting down from the count to keep the location on the current line synchronized with the previous line so that corresponding locations can be known.

7. A method according to claim 6 wherein the ascertaining step comprises the steps of:

latching read out contents; and comparing the address portion of the read out contents with the present address on the current line and producing an equivalence indication when they are equal.

8. A method according to claim 1 wherein pixel addresses include a side indication.

9. A method according to claim 3 wherein pixel addresses include a side indication.

10. A method according to claim 5 wherein pixel addresses include a side indication.

11. A system for mapping a video image in a first two-dimensional plane into a video image in a second two-dimensional plane according to an arbitrary mapping function, the system comprising:

means for mapping addresses of the video image in the first two-dimensional plane into the second two-dimensional plane to produce quadrilateral addresses;

means for translating an origin to produce sub-pixel addresses, pixel addresses, and bank-set selection signals from the quadrilateral addresses;

means for generating weighting coefficients from the bank-set selection signals and the sub-pixel addresses to produce coefficients indicative of an area of a quadrilateral that is within each of a plurality of banks;

means for using the generated coefficients and the pixel addresses, to produce video data and video addresses in the second two-dimensional plane; and means for organizing the video data and video addresses in the second two-dimensional plane to produce the video image in the second two-dimensional plane.

12. A system according to claim 11 wherein the means for generating weighting coefficients comprises:

means for determining which of a plurality of geometric cases pertains from a relationship between the sub-pixel addresses and bank-set selection signals;

means for ascertaining secondary triangle ratios from appropriately selected sub-pixel addresses based on the determined case;

means for calculating primary triangle areas ABO, BDO, DCO and CAO from the sub-pixel addresses;

means for multiplying the primary triangle areas by the secondary triangle ratios according to the determined case to obtain secondary triangle areas; and means for combining primary triangle areas with secondary triangle areas according to the determined case to obtain coefficients indicative of the area of a quadrilateral that is within each of the plurality of banks.

13. A system according to claim 11 wherein the means for using comprises:
- means for multiplying video data by an associated generated coefficient to produce a weighted video data element;
- means for identifying same pixels from the pixel addresses to produce a same pixel signal when a current pixel has the same address as a previous pixel;
- means for accumulating weighted video data elements associated with the same output pixel into a running total based on the same pixel signal;
- means for determining when there is no additional data associated with a pixel; and
- means for outputting a video address in the second two-dimensional plane and associated video data from the running total when it is determined that there is no additional data associated with a pixel.

14. A system according to claim 13 wherein the means for identifying same pixels comprises:
- means for latching a previous address; and
- means for comparing the previous address with a current address to produce a same pixel signal when the previous address and the current address are equal.

15. A system according to claim 13 wherein the means for accumulating comprises:
- means for summing weighted video data elements associated with the same pixel together into a line running total according to the same pixel signal;
- means for storing the line running total, an associated pixel address, and a count representing how many quadrilaterals on the present line contributed to the line running total; and
- means for recalling the line running total from a previous line when a line running total on a present line should include a line running total on a previous line in order to produce a complete line running total.

16. A system according to claim 15 wherein the means for recalling the line running total comprises:
- means for reading out the stored line running total and associated pixel address and the count while at a location on the current line corresponding to a location of the stored line running total on the previous line;
- means for ascertaining from the read out contents whether any of the associated pixel addresses from the previous line are the same as the present address on the current line;
- means for presenting the line running total associated with the associated pixel address for summation when one of the associated pixel addresses is the same as the present address on the current line; and
- means for counting down from the count to keep the location on the current line synchronized with the previous line so that corresponding locations can be known.

17. A system according to claim 16 wherein the means for ascertaining comprises:
- means for latching read out contents; and
- means for comparing the address portion of the read out contents with the present address on the current line and producing an equivalence indication when they are equal.

18. A system according to claim 11 wherein pixel addresses include a side indication.

19. A system according to claim 13 wherein pixel addresses include a side indication.

20. A system according to claim 15 wherein pixel addresses include a side indication.

* * * * *